United States Patent
Comte et al.

(10) Patent No.: US 11,370,693 B2
(45) Date of Patent: Jun. 28, 2022

(54) GLASS-CERAMIC ARTICLES, COMPOSITIONS, AND METHODS OF MAKING THE SAME

(71) Applicant: CORNING INCORPORATED, Corning, NY (US)

(72) Inventors: Marie Jacqueline Monique Comte, Fontenay aux Roses (FR); Indrajit Dutta, Horseheads, NY (US); Jian-Zhi Jay Zhang, Ithaca, NY (US)

(73) Assignee: Corning Incorporated, Corning, NY (US)

( * ) Notice: Subject to any disclaimer, the term of this patent is extended or adjusted under 35 U.S.C. 154(b) by 80 days.

(21) Appl. No.: 16/750,570

(22) Filed: Jan. 23, 2020

(65) Prior Publication Data
US 2020/0239352 A1 Jul. 30, 2020

Related U.S. Application Data

(60) Provisional application No. 62/797,590, filed on Jan. 28, 2019.

(51) Int. Cl.
*C03C 3/085* (2006.01)

(52) U.S. Cl.
CPC .................................. *C03C 3/085* (2013.01)

(58) Field of Classification Search
CPC ................ C03C 3/085; C03C 10/0045; C03C 10/0009
See application file for complete search history.

(56) References Cited

U.S. PATENT DOCUMENTS

| | | | |
|---|---|---|---|
| 3,485,644 A * | 12/1969 | Shonebarger | C03C 10/0054 501/4 |
| 3,524,748 A | 8/1970 | Beall | |
| 6,197,429 B1 | 3/2001 | Lapp et al. | |
| 6,627,565 B1 | 9/2003 | Zou et al. | |

(Continued)

FOREIGN PATENT DOCUMENTS

| | | |
|---|---|---|
| EP | 1486467 A1 | 12/2004 |
| WO | 2017104513 A1 | 6/2017 |
| WO | 2017104514 A1 | 6/2017 |

OTHER PUBLICATIONS

Borrelli; "Glass-Ceramics By Photosensitive Process"; App Gls Sc. 6[3] 268-274 (2015).

(Continued)

*Primary Examiner* — Karl E Group
*Assistant Examiner* — Cameron K Miller
(74) *Attorney, Agent, or Firm* — Smit Kapadia

(57) ABSTRACT

A glass-ceramic article that includes an article having a glass-ceramic composition, the composition including:
$SiO_2$ from about 45% to about 65%,
$Al_2O_3$ from about 14% to about 28%,
$TiO_2$ from about 2% to about 4%,
$ZrO_2$ from about 3% to about 4.5%,
MgO from about 4.5% to about 12%, and
ZnO from about 0.1 to about 4% (by weight of oxide).
The article can include a coefficient of thermal expansion (CTE) of about $20 \times 10^{-7}$ K$^{-1}$ to about $160 \times 10^{-7}$ K$^{-1}$, as measured over a temperature range from 25° C. to 300° C.

17 Claims, 5 Drawing Sheets

(56) References Cited

U.S. PATENT DOCUMENTS

| | | |
|---|---|---|
| 7,300,896 B2 | 11/2007 | Zachau et al. |
| 8,853,110 B2 | 10/2014 | Almoric et al. |
| 2005/0155386 A1 | 7/2005 | Kataoka et al. |
| 2008/0268295 A1 | 10/2008 | Yagi |

OTHER PUBLICATIONS

Dittmer et al.; "Self-Organized Nanocrystallinity In MgOAl2O3SiO2 Glasses With ZrO2 As Nucleating Agent" ; Materials Chemistry and Physics 124 (2010) 1083 1088.
Shao et al.; "Crystallization and Thermal Expansion Of MgO-Al2O3-SiO2-TiO2 Glass-Ceramics" Key Engineering Materials; vols. 280-283, pp. 1635-1638 Online: 2007-02-15.
Hunger et al.; "Formation of Nano-Crystalline Quartz Crystals From ZnO/MgO/Al2O3/TiO2/ZrO2/SiO2 Glasses'"; Solid State Sciences 12 (2010) 1570-1574.
Seidel et al.; "High-Strength, Translucent Glass-Ceramics in the System MgO-ZnO-Al2O3-SiO2-ZrO2" Journal of the European Ceramic Society 37 (2017) 2685-2694.
International Search Report and Written Opinion of the International Searching Authority; PCT/US2020/014553; dated May 4, 2020; 10 Pages; European Patent Office.

\* cited by examiner

GLASS-CERAMIC ARTICLES, COMPOSITIONS, AND METHODS OF MAKING THE SAME

This application claims the benefit of priority to U.S. Provisional Application Ser. No. 62/797,590 filed on Jan. 28, 2019, the content of which is relied upon and incorporated herein by reference in its entirety.

FIELD

The present disclosure generally relates to glass-ceramic articles, compositions, and methods of making the same, particularly glass-ceramic substrates and carriers for semiconductor devices having a tunable coefficient of thermal expansion (CTE).

BACKGROUND

The semiconductor packaging industry utilizes a variety of materials during the chip fabrication process depending on the processing steps and the desired end-product characteristics. Chips can be placed on carrier substrates for processing steps that include thermomechanical and lithographic steps for application of metal connects, epoxy molding compounds, and soldering, for example. Polymeric materials can be used as carrier substrates for some packaging processes, however, the structural instability of some polymeric materials at high temperatures limits the use of polymeric materials in those packaging processes requiring higher processing temperatures.

Glass-ceramic materials can be formed having a coefficient of thermal expansion (CTE) suitable for many chip packaging processes, including those processes requiring high temperatures. However, variations in packaging process parameters result in the need for customized glass-ceramic materials to meet specific CTE requirements. For example, a minimum CTE may be required in order to reduce in-process stress and warping during packaging. In addition to CTE requirements, glass-ceramic materials also need to satisfy requirements relating to elastic modulus, substrate thickness, and transparency, which can vary across products and packaging processes.

Therefore, there is a need for glass-ceramic articles and compositions, and methods of making these articles and compositions, which can address these challenges.

SUMMARY

According to one aspect, a glass-ceramic article includes an article having a glass-ceramic composition, the composition including:
$SiO_2$ from about 45% to about 65%,
$Al_2O_3$ from about 14% to about 28%,
$TiO_2$ from about 2% to about 4%,
$ZrO_2$ from about 3% to about 4.5%,
MgO from about 4.5% to about 12%, and
ZnO from about 0.1 to about 4% (by weight of oxide).
The article can include a coefficient of thermal expansion (CTE) of about $20 \times 10^{-7}$ $K^{-1}$ to about $160 \times 10^{-7} K^{-1}$, as measured over a temperature range from 25° C. to 300° C.

According to another aspect of the disclosure, a glass-ceramic article includes an article having a glass-ceramic composition, the composition including:
$SiO_2$ from about 45% to about 65%,
$Al_2O_3$ from about 14% to about 28%,
$TiO_2$ from about 2% to about 4%,
$ZrO_2$ from about 3% to about 4.5%,
MgO from about 4.5% to about 12%, and
ZnO from about 0.1 to about 4% (by weight of oxide).
The article can further include at least one of a β-quartz crystalline phase and an α-quartz crystalline phase.

According to another aspect of the present disclosure, a method of making a glass-ceramic article is provided. The method includes forming a glass-ceramic precursor having a composition including:
$SiO_2$ from about 45% to about 65%,
$Al_2O_3$ from about 14% to about 28%,
$TiO_2$ from about 2% to about 4%,
$ZrO_2$ from about 3% to about 4.5%,
MgO from about 4.5% to about 12%, and
ZnO from about 0.1 to about 4% (by weight of oxide).
The method further includes heating the glass-ceramic precursor to form a glass-ceramic article. The article can include a coefficient of thermal expansion (CTE) of about $20 \times 10^{31\ 7} K^{-1}$ to about $160 \times 10^{31\ 7} K^{31\ 1}$, as measured over a temperature range from 25° C. to 300° C.

According to another aspect of the present disclosure, a method of making a glass-ceramic article is provided. The method includes forming a glass-ceramic precursor having a composition including:
$SiO_2$ from about 45% to about 65%,
$Al_2O_3$ from about 14% to about 28%,
$TiO_2$ from about 2% to about 4%,
$ZrO_2$ from about 3% to about 4.5%,
MgO from about 4.5% to about 12%, and
ZnO from about 0.1 to about 4% (by weight of oxide).
The method further includes heating the glass-ceramic precursor to form a glass-ceramic article. The article can include at least one of a β-quartz crystalline phase and an α-quartz crystalline phase.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
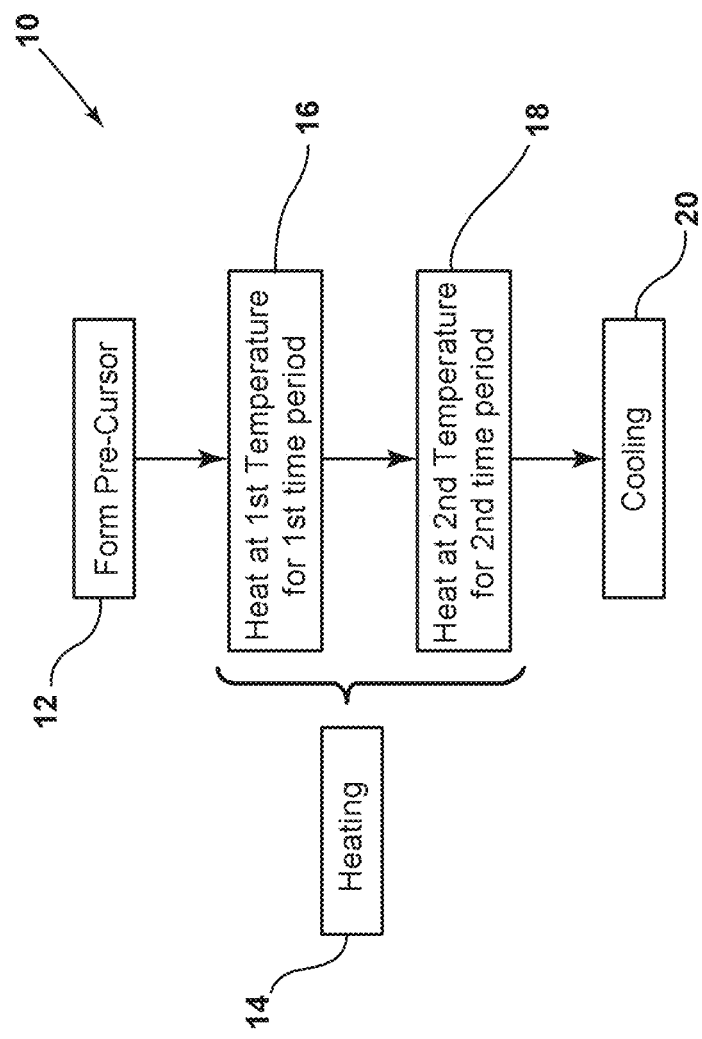
FIG. 1 is a flow chart depicting a method of forming a glass-ceramic article, according to an aspect of the present disclosure.

Reference will now be made in detail to the present preferred embodiments, examples of which are illustrated in the accompanying drawings. Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

The term "formed from" can mean one or more of comprises, consists essentially of, or consists of. For example, a component that is formed from a particular material can comprise the particular material, consist essentially of the particular material, or consist of the particular material.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As also used herein, the terms "article," "glass-article," "ceramic-article," "glass-ceramics," "glass elements," "glass-ceramic article" and "glass-ceramic articles" may be used interchangeably, and in their broadest sense, to include any object made wholly or partly of glass and/or glass-ceramic material.

As used herein, a "glass state" refers to an inorganic amorphous phase material within the articles of the disclosure that is a product of melting that has cooled to a rigid condition without crystallizing. As used herein, a "glass-ceramic state" refers to an inorganic material within the articles of the disclosure which includes both the glass state and a "crystalline phase" and/or "crystalline precipitates" as described herein.

As used herein, "transmission", "transmittance", "optical transmittance" and "total transmittance" are used interchangeably in the disclosure and refer to external transmission or transmittance, which takes absorption, scattering and reflection into consideration. Fresnel reflection is not subtracted out of the transmission and transmittance values reported herein. In addition, any total transmittance values referenced over a particular wavelength range are given as an average of the total transmittance values measured over the specified wavelength range.

The term "coefficient of thermal expansion" or CTE is an average CTE over a particular range of temperatures.

The elastic modulus (also referred to as Young's modulus) of the substrate is provided in units of gigaPascals (GPa). The elastic modulus of the substrate is determined by resonant ultrasound spectroscopy on bulk samples of the substrate.

Concentrations of the constituent components are specified in weight percent (wt %) on an oxide basis unless otherwise specified.

Aspects of the present disclosure relate to a glass-ceramic article having a coefficient of thermal expansion (CTE) which is adjustable within a predetermined range of CTE values based on the parameters of a heat treatment process. In this manner, a single glass composition can be utilized to provide a glass-ceramic article having a range of tunable CTE values. Aspects of the present disclosure may also relate to a glass-ceramic article having an α-quartz and/or β-quartz crystalline phase which is adjustable based on the parameters of a heat treatment process.

The materials and methods described herein provide for glass-ceramic precursor compositions which can be treated according to a heating process to form a glass-ceramic having certain properties that are customized according to the requirements of the packaging process and/or the intended use of the formed articles. In this manner, rather than customizing each composition in order to provide a material having the desired properties, a single composition can be utilized and subjected to a treatment process that adjusts the properties of the formed article to satisfy the desired requirements. The compositions of the present disclosure have a CTE range before and after heating that is large enough to provide a useful window within which the CTE can be adjusted to intermediate values during heating in order to satisfy a wide range of packaging process requirements. The compositions of the present disclosure have a CTE range that can be adjusted between a low and a high value as well as intermediate values in-between based on the treatment process to allow for a wide range of customized CTE options for a particular composition. Utilizing a single composition that can be treated to satisfy a range CTE value requirements, rather than designing unique compositions to satisfy each set of requirements, can provide economic and logistical benefits to manufacturers.

The glass-ceramic precursor composition of the present disclosure includes $SiO_2$, $Al_2O_3$, $TiO_2$, $ZrO_2$, MgO, and ZnO. Optionally, the glass composition can include additional components, non-limiting examples of which include CaO, BaO, $P_2O_5$, $B_2O_3$, $La_2O_3$, and alkali metal oxides. According to one aspect of the present disclosure, the glass composition is substantially free of alkali metals. As used herein with respect to alkali metals, the phrase substantially free is defined as meaning that no alkali metals are added to the composition, although minor amounts of alkali metals may be present due to contamination. In other aspects, the glass composition can include one or more alkali metals. Optionally, the glass composition can include a fining agent, one example of which includes $SnO_2$.

The glass-ceramic precursor composition can include $SiO_2$ in an amount of from about 45% by weight (wt %) to about 65 wt %. In some aspects, the amount of $SiO_2$ can be in the range of about 45 wt % to about 60 wt %, about 45 wt % to about 55 wt %, about 45 wt % to about 50 wt %, about 50 wt % to about 55 wt %, about 50 wt % to about 60 wt %, about 50 wt % to about 65 wt %, about 55 wt % to about 60 wt %, about 55 wt % to about 65 wt %, or about 60 wt % to about 65 wt %. In some aspects, the amount of $SiO_2$ is about 45 wt %, about 50 wt %, about 55 wt %, about 60 wt %, or about 65 wt %. In further implementations, the $SiO_2$ content can be in the amount of about 60 wt %, about 61 wt %, about 62 wt %, about 63 wt %, or about 65 wt %. When the amount of $SiO_2$ is too low, for example, less than about 40 wt %, devitrification can be enhanced and it can become difficult to obtain a crystallized glass having a suitable impact resistance. When the amount of $SiO_2$ is too high, for example, greater than about 70 wt %, obtaining the desired crystalline assemblage can be challenging. In addition, when the amount of $SiO_2$ is too high, the melting ability of the glass decreases and the viscosity increases, so formation of the glass can become difficult.

The glass-ceramic precursor composition can include $Al_2O_3$ in an amount of from about 14 wt % to about 28 wt %. In some aspects, the amount of $Al_2O_3$ can be in the range of about 14 wt % to about 18 wt %, about 14 wt % to about 22 wt %, about 14 wt % to about 24 wt %, about 14 wt % to about 26 wt %, about 16 wt % to about 20 wt %, about 16 wt % to about 24 wt %, about 16 wt % to about 28 wt %, about 18 wt % to about 22 wt %, about 18 wt % to about 26 wt %, about 18 wt % to about 28 wt %, about 20 wt % to about 24 wt %, about 20 wt % to about 28 wt %, or about 24 wt % to about 28 wt %. In some aspects, the amount of $Al_2O_3$ can be in the range of about 14 wt %, about 16 wt %, about 18 wt %, about 20 wt %, about 22 wt %, about 24 wt %, or about 28 wt %. In further implementations, the amount of $Al_2O_3$ can be about 18 wt %, about 19 wt %, about 20 wt %, or about 21 wt %. When the amount of $Al_2O_3$ is too low, for example, less than about 10 wt %, devitrification can be enhanced; when the amount $Al_2O_3$ is too high, for example, greater than about 30 wt %, obtaining the desired crystalline assemblage can be challenging. $Al_2O_3$ can also increase the softening point of the glass, thereby reducing the formability of the glass.

The glass-ceramic precursor composition can include $TiO_2$ and $ZrO_2$ as nucleating agents. The $TiO_2$ can be present in an amount of from about 2 wt % to about 4 wt %. In some aspects, the $TiO_2$ can be present in an amount of from about 2 wt % to about 3.5 wt %, about 2 wt % to about 3 wt %, about 2 wt % to about 2.5 wt %, about 2.5 wt % to about 3 wt %, about 2.5 wt % to about 3.5 wt %, about 2.5 wt % to about 4 wt %, about 3 wt % to about 3.5 wt %, about 3 wt % to about 4 wt %, or about 3.5 wt % to about 4 wt %. In further implementations, the $TiO_2$ can be present in an amount of about 2 wt %, about 2.5 wt %, about 3 wt %, about 3.5 wt %, or about 4 wt %. In other aspects, the $TiO_2$ can be present in an amount of about 2.3 wt %, about 2.4 wt %, about 2.5 wt %, about 2.6 wt %, about 2.7 wt %, about 2.8 wt %, about 2.9 wt %, about 3.0 wt %, about 3.1 wt %, about 3.2 wt %, about 3.3 wt %, about 3.4 wt %, about 3.5 wt %, about 3.6 wt %, or about 3.7 wt %.

The $ZrO_2$ can be present in an amount of from about 1 wt % to about 4.5 wt %. In some aspects, the $ZrO_2$ is present in an amount of from about 1 wt % to about 4 wt %, about 1 wt %, to about 3.5 wt %, about 1 wt % to about 3 wt %, about 1 wt % to about 2.5 wt %, about 1 wt % to about 2 wt %, about 1 wt % to about 1.5 wt %, about 1.5 wt % to about 2 wt %, about 1.5 wt % to about 2.5 wt %, about 1.5 wt % to about 3 wt %, about 1.5 wt % to about 3.5 wt %, about 1.5 wt % to about 4 wt %, about 1.5 wt % to about 4.5 wt %, about 2 wt % to about 2.5 wt %, about 2 wt % to about 3 wt %, about 2 wt % to about 3.5 wt %, about 2 wt % to about 4 wt %, about 2 wt % to about 4.5 wt %, about 2.5 wt % to about 3 wt %, about 2.5 wt % to about 3.5 wt %, about 2.5 wt % to about 4 wt %, about 2.5 wt % to about 4.5 wt %, about 3 wt % to about 3.5 wt %, about 3 wt % to about 4 wt %, about 3 wt % to about 4.5 wt %, about 3.5 wt % to about 4 wt %, about 3.5 wt % to about 4.5 wt %, or about 4 wt % to about 4.5 wt %. In some aspects, the $ZrO_2$ is present in an amount of about 1 wt %, about 1.5 wt %, about 2 wt %, about 2.5 wt %, about 3 wt %, about 3.5 wt %, about 4 wt %, or about 4.5 wt %. In a further implementation, the $ZrO_2$ is present in an amount of about 2.1 wt %, about 2.2 wt %, about 2.3 wt %, about 2.4 wt, about 2.5 wt %, about 3.5 wt %, about 3.6 wt %, about 3.7 wt %, about 3.8 wt %, about 3.9 wt %, or about 4 wt %. In addition to its role as a nucleating agent, $ZrO_2$ can also increase the resistance of the glass-ceramic article to chemical attack. When the amount of $ZrO_2$ is too high, the liquidus temperature increases, which can make melting the glass composition more difficult. Further, when the content of $ZrO_2$ is too high, the material may not dissolve in the glass composition, which can produce defects in the glass composition, and may also increase the elastic modulus. When the amount of $ZrO_2$ is too low, nucleation is not sufficient. The obtention of opalescent material with a high transmission in the IR is favored by a high $ZrO_2$ level (>3.5 wt %).

In some aspects of the present disclosure, the total combined amount of $TiO_2$ plus $ZrO_2$ present in the precursor composition is greater than about 4.5 wt %. In some aspects of the present disclosure, the total combined amount of $TiO_2$ plus $ZrO_2$ present in the precursor composition is greater than about 5 wt %. In some implementations, the total combined amount of $TiO_2$ and $ZrO_2$ is greater than about 6 wt %, greater than about 7 wt %, or greater than about 8 wt %. In some aspects, the total combined amount of $TiO_2$ and $ZrO_2$ is in the range of about 5 wt % to about 8.5 wt %, about 5 wt % to about 8 wt %, about 5 wt % to about 7 wt %, about 5 wt % to about 6 wt %, about 6 wt % to about 7 wt %, about 6 wt % to about 8 wt %, about 6 wt % to about 8.5 wt %, about 7 wt % to about 8 wt %, about 7 wt % to about 8.5 wt %, or about 8 wt % to about 8.5 wt %. In some aspects the total combined amount of $TiO_2$ and $ZrO_2$ is about 4.5 wt %, about 5 wt %, about 5.5 wt %, about 6 wt %, about 6.5 wt %, about 7 wt %, about 7.5 wt %, about 8 wt %, or about 8.5 wt %. In some aspects the total combined amount of $TiO_2$ and $ZrO_2$ is about 5.8 wt %, about 5.9 wt %, about 6.0 wt %, about 6.1 wt %, about 6.2 wt %, about 6.3 wt %, about 6.4 wt %, or about 6.5 wt %. When the amount of $TiO2+ZrO2$ is too low (e.g. less than 4.5 wt %) nucleation is not sufficient.

The glass-ceramic precursor composition further includes MgO present in an amount of from about 4.5 wt % to about 12 wt %, optionally about 5 wt % to about 12 wt %. In some aspects, MgO can be present in an amount of about 4.5 wt % to about 10 wt %, about 4.5 wt % to about 8 wt %, about 4.5 wt % to about 7 wt %, about 4.5 wt % to about 6 wt %, about 4.5 wt % to about 6.5 wt %, or about 4.5 wt % to about 5 wt %. In some aspects, the MgO can be present in an amount of about 4.5 wt %, about 5 wt %, about 5.5 wt %, about 6 wt %, or about 6.5 wt %. MgO can contribute to formation of β-quartz and spinel crystalline phases and thus in some cases is preferably at least about 5 wt %. When the MgO content is too high, the transparency of the formed glass-ceramic article can be decreased.

The glass-ceramic precursor composition also includes ZnO in an amount of about 0.1 wt % to about 4 wt %. In some aspects, the amount of ZnO is in the range of about 0.1 wt % to less than 4 wt %, about 0.1 wt % to about 1 wt %, about 0.1 wt % to about 2 wt %, about 0.1 wt % to about 3 wt %, about 0.1 wt % to about 3.5 wt %, about 1 wt % to about 2 wt %, about 1 wt % to about 3 wt %, about 1 wt % to about 3.5 wt %, about 1 wt % to about 4 wt %, about 2 wt % to about 3 wt %, about 2 wt % to about 3.5 wt %, about 2 wt % to about 4 wt %, or about 3 wt % to about 4 wt %. In further implementations, the amount of ZnO is about 1 wt %, about 1.5 wt %, about 2 wt %, about 2.5 wt %, about 3 wt %, or about 3.5 wt %. When the amount of ZnO is too high, the formation of a gahnite crystalline phase is favored over a β-quartz crystalline phase, which is undesirable for reasons which will be presented herein. As will be discussed in more detail below, compositions according to the present disclosure have the ability to form glass-ceramic articles have a β-quartz crystalline phase which is adjustable based on the parameters of a heating process. In addition, ZnO can also contribute to the chemical resistance of the glass-ceramic article.

The additional components CaO, $P_2O_5$, $B_2O_3$, and $La_2O_3$, when present, are generally present in an amount less than about 5 wt %. In some aspects, CaO is absent. In further implementations, CaO is present in an amount greater than 0.1 wt % to less than about 5 wt %, about 0.1 wt % to about 4 wt %, about 0.1 wt % to about 3 wt %, about 0.1 wt % to about 2 wt %, or about 0.1 wt % to about 1 wt %. In some aspects, $P_2O_5$ is absent. In further implementations, $P_2O_5$ is present in an amount greater than 0.1 wt % to less than about 5 wt %, about 0.1 wt % to about 4 wt %, about 0.1 wt % to about 3 wt %, about 0.1 wt % to about 2 wt %, or about 0.1 wt % to about 1 wt %. In some aspects, $B_2O_3$ is absent. In further implementations, $B_2O_3$ is present in an amount greater than 0.1 wt % to less than about 5 wt %, about 0.1 wt % to about 4 wt %, about 0.1 wt % to about 3 wt %, about 0.1 wt % to about 2 wt %, or about 0.1 wt % to about 1 wt %. In some aspects, $La_2O_3$ is absent. In further implementations, $La_2O_3$ is present in an amount greater than 0.1 wt % to less than about 5 wt %, about 0.1 wt % to about 4 wt %, about 0.1 wt % to about 3 wt %, about 0.1 wt % to about 2 wt %, or about 0.1 wt % to about 1 wt %. The boron concentration in the compositions from which the glass-ceramic articles are formed is a flux which may be added to make the viscosity-temperature curve less steep as well as lowering the entire curve, thereby improving the formability of the glass and softening the glass.

According to another aspect of the present disclosure, the glass-ceramic precursor composition can include BaO. BaO can optionally be present in an amount greater than 0 and less than about 8 wt %. In some aspects, BaO is present in an amount of about 0.1 wt % to about 8 wt %, about 1 wt % to about 8 wt %, about 1 wt % to about 6 wt %, about 1 wt % to about 4 wt %, about 1 wt % to about 3 wt %, about 2 wt % to about 8 wt %, about 2 wt % to about 6 wt %, about 2 wt % to about 4 wt %, or about 2 wt % to about 3 wt %. In some implementations, BaO is present in an amount of about 1 wt %, about 2 wt %, about 3 wt %, about 4 wt %, about 5 wt %, about 6 wt %, about 7 wt %, or about 8 wt %. BaO can contribute to the transparency of the glass-ceramic article.

The glass-ceramic precursor compositions may optionally include one or more fining agents, such as, by way of non-limiting example, $SnO_2$, $Sb_2O_3$, $As_2O_3$, $F^-$, and/or $Cl^-$ (from NaCl or the like). When a fining agent is present in the glass composition, the fining agent may be present in an amount less than about 2 wt %. In some aspects, the fining agent is present in an amount of about 0.1 wt % to about 2 wt %, about 0.1 wt % to about 1 wt %, about 0.1 wt % to about 0.5 wt %, or about 1 wt % to about 2 wt %. When the content of the fining agent is too large, the fining agent may enter the glass structure and affect various glass properties. However, when the content of the fining agent is too low, the glass may be difficult to form. According to one aspect of the disclosure, $SnO_2$ is included as a fining agent in an amount greater than 0 and less than about 2 wt %.

According to one aspect, the glass-ceramic precursor composition does not include added alkali metal oxides and is thus substantially free of alkali metals. Alkali metals in a carrier or substrate have the potential to migrate during processing and/or storage of the semiconductor chip and contaminate the chip.

Optionally, the glass-ceramic precursor composition can include one or more alkali metal oxides. The alkali oxides can facilitate the melting of the glass composition, may lower the 200 Poise temperature, and/or may lower the softening point of the glass. In some aspects, the alkali metal oxides may off-set an increase in the softening point that can occur at higher concentrations of $SiO_2$ and/or $Al_2O_3$ in the glass composition. The alkali metal oxides, such as $Li_2O$, $Na_2O$, and $K_2O$, when present, are generally present in an amount less than about 5 wt %. When present, one or more alkaline earth oxide can be present in an amount of less than about 5 wt %. In some aspects, one or more alkaline earth oxides are present in an amount greater than 0.1 wt % to less than about 5 wt %, about 0.1 wt % to about 4 wt %, about 0.1 wt % to about 3 wt %, about 0.1 wt % to about 2 wt %, or about 0.1 wt % to about 1 wt %.

According to another aspect, the glass-ceramic precursor has a viscosity of 200 Poise (P) at 1600° C. The 200 Poise temperature is the minimum temperature at which the glass has a viscosity of 200 Poise, which is indicative of a minimum temperature of a well-melted glass. In some aspects, the precursor has a 200 Poise temperature in the range of about 1000° C. to about 1600° C., about 1000° C. to about 1500° C., about 1000° C. to about 1400° C., about 1000° C. to about 1300° C., about 1000° C. to about 1200° C., about 1000° C. to about 1100° C., about 1100° C. to about 1600° C., about 1200° C. to about 1600° C., about 1300° C. to about 1600° C., about 1400° C. to about 1600° C., or about 1500° C. to about 1600° C. The glass-ceramic precursor can have a liquidus temperature in the range of about 1425° C. to about 1444° C., which corresponds to a viscosity at the liquidus in the range of about 1200 P to about 1400 P. In some aspects, the liquidus temperature is in the range of about 1000° C. to about 1500° C., about 1000° C. to about 1400° C., about 1000° C. to about 1300° C., about 1000° C. to about 1200° C., about 1000° C. to about 1100° C., about 1200° C. to about 1500° C., about 1300° C. to about 1500° C., about 1400° C. to about 1500° C., or about 1400° C. to about 1450° C. In some aspects, the primary phase of devitrification may be zircon.

Each glass-ceramic precursor composition according to the present disclosure can be used to form glass-ceramic articles having different coefficient of thermal expansion (CTE) values within the range of about $20 \times 10^{-7}$ $K^{-1}$ to about $160 \times 10^{-7} K^{-1}$, about $20 \times 10^{-7} K^{-1}$ to about $150 \times 10^{-7} K^{-1}$, or about $20 \times 10^{-7} K^{-1}$ to about $135 \times 10^{-7} K^{-1}$ inclusive of intermediate CTE values. Semiconductor manufacturers and those who utilize semiconductors in their manufacturing processes can often have CTE requirements that vary across packaging platforms and product lines, as well as varying between different manufacturing locations and different manufacturers. The glass-ceramic precursor compositions of the present disclosure can provide glass-ceramic articles having CTE values which can be customized or "tuned" during a heating process within a range of CTE values. The range of CTE values of the articles of the present disclosure generally overlaps with the CTE values typically required in the semiconductor packaging and related industries. According to the present disclosure, a single glass-ceramic precursor composition can be utilized to provide glass-ceramic articles having a tunable CTE value, where each glass-ceramic article made from a given precursor composition has a different CTE value, based on the manner in which the precursor composition is treated. In this manner, rather than preparing customized compositions to satisfy each CTE requirement a manufacturer may have, a single precursor composition can be utilized and the treatment process can be tailored to provide articles having different CTE values to satisfy the various manufacturing requirements.

Optionally, the glass-ceramic articles have a CTE range that is defined from a lower end of about $20 \times 10^{-7} K^{-1}$ to about $30 \times 10^{-7} K^1$ to an upper end of about $55 \times 10^{-7} K^1$ to about $160 \times 10^{-7} K^{-1}$, about $55 \times 10^{-7} K^{-1}$ to about $150 \times 10^{-7} K^{-1}$, or about $55 \times 10^{-7} K^{-1}$ to about $135 \times 10^{-7} K^{-1}$. The lower end and upper end ranges define a useful window within which the CTE of the glass-ceramic article can be adjusted based on treatment of the glass-ceramic precursor during a heating process. When this CTE window overlaps with a range of CTE values required by a semiconductor manufacturer, a single glass-ceramic precursor composition can be utilized to satisfy multiple processing or product requirements. Each glass-ceramic precursor composition of the present disclosure can be treated to customize or tune the CTE of the glass-ceramic articles formed from each glass-ceramic precursor composition. For example, a semiconductor manufacturer could have two different semiconductor chip product lines, each product line having different CTE requirements based on the chip processing parameters, downstream processing requirements, and/or the end use requirements of the chip, for example. Rather than mixing separate precursor batches for each product line, the glass-ceramic precursor composition of the present disclosure allows for a single batch to be prepared and glass-ceramic articles meeting the CTE requirements for both product lines can be formed from this single batch by varying the heating process of the glass-ceramic precursors. Utilizing a single composition, and optionally a single glass-ceramic precursor batch, to produce glass-ceramic articles having different CTE values can simplify the manufacturing process, which can provide time and cost benefits. For example, purchasing, storage, and preparation can be simplified when the same glass-precursor composition is used across multiple product lines as compared to requiring a unique composition for each product line.

The glass-ceramic articles can also have a high elastic modulus that is preferably greater than 80 Gigapascals (GPa), optionally within the range of about 80 GPa to about 100 GPa, further optionally greater than 100 GPa. In one aspect, the elastic modulus is about 80 GPa to about 140 GPa, about 80 GPa to about 130 GPa, about 80 GPa to about 120 GPa, about 80 GPa to about 110 GPa, about 80 GPa to about 100 GPa, about 80 GPa to about 90 GPa, about 90 GPa to about 100 GPa, about 90 GPa to about 110 GPa, about 90 GPa to about 120 GPa, about 90 GPa to about 130 GPa, about 90 GPa to about 140 GPa, about 100 GPa to about 110 GPa, about 100 GPa to about 120 GPa, about 100 GPa to about 130 GPa, or about 100 GPa to about 140 GPa. In some implementations, the elastic modulus is about 80 GPa, about 90 GPa, about 100 GPa, about 110 GPa, about 120 GPa, about 130 GPa, or about 140 GPa. A high elastic modulus can decrease the likelihood of in-process warp or flexing, which can minimize the likelihood of damage to devices attached to the article, such as when the article is used as a carrier substrate for electronic devices.

The glass-ceramic articles of the present disclosure can also be at least partially transparent to light having a wavelength within the near-infrared range. In one aspect, the glass-ceramic article can have an optical transmittance of at least about 75% at a wavelength of 1060 nm for an article having a thickness of less than about 1 mm. According to one aspect, the total optical transmittance, including both direct and diffuse transmission, is at least 75%. In some aspects, the total optical transmittance is at least 75% at wavelengths between about 1060 nm to about 2300 nm, about 1060 nm to about 2000 nm, about 1060 nm to about 1700 nm, about 1060 nm to about 1400 nm, or about 1060 nm to about 1200. In some aspects the total optical transmittance at wavelengths between about 1060 nm and 2300 nm is about 50% to about 90%, about 50% to about 80%, about 50% to about 70%, about 50% to about 60%, about 60% to about 90%, about 60% to about 80%, about 60% to about 70%, about 70% to about 80%, about 70% to about 90%, or about 80% to about 90%. A glass-ceramic article that allows for the transmission of light in the near-infrared region of the electromagnetic spectrum could be useful in semiconductor processes that utilize a laser to de-bond the substrate. Optionally, the glass-ceramic can be at least partially transparent to visible light.

The glass-ceramic articles of the present disclosure can be further characterized by having a crystalline microstructure that is adjustable between β-quartz as the main phase and a-quartz as the main phase based on treatment parameters during a heating process. In some aspects, the glass-ceramic articles can have a crystalline microstructure that is adjustable between conditions having a β-quartz phase in the absence of an α-quartz phase and having an α-quartz phase in the absence of a β-quartz phase, and intermediate ratios of α-quartz phase and β-quartz in-between. According to another aspect, the glass-ceramic articles of the present disclosure are defined by a range of ratios of an α-quartz crystalline phase to a β-quartz crystalline phase, preferably a range defined by a lower end of about 0.3:1 and an upper end of about 74:0. In some implementations, the crystalline microstructure is adjustable between a ratio of an α-quartz crystalline phase to a β-quartz crystalline phase of about 0.3:1, 0.4:1, 0.5:1, 0.6:1, 0.7:1, 0.8:1, 0.9:1, 1:1, 1.5:1, 2:1, 2.5:1, 3:1, 4:1, 5:1, 6:1, 7:1, 16:1, or greater, and intermediate ratios in between. In another aspect, the β-quartz crystalline phase includes a ratio of aluminum to silicon that is greater than a ratio of aluminum to silicon present in the α-quartz.

Optionally, the glass-ceramic article can include at least one additional crystalline phase, such as a spinel and/or a gahnite crystalline phase. The additional crystalline phase(s) can be present in a range of about 8 wt % to about 21 wt %. In some aspects, the additional crystalline phase is present in a range of about 0.1 wt % to about 21 wt %, about 0.1 wt % to about 15 wt %, about 0.1 wt % to about 10 wt %, about 0.1 wt % to about 8 wt %, or about 0.1 wt % to about 6 wt %. The amount and character of the additional crystalline phase(s) can be adjustable based on the parameters during the heating process. In some implementations, the glass-ceramic article can include other crystalline phases, examples of which include srilankite and cristobalite.

Exemplary glass-ceramic precursor compositions for making glass-ceramic articles according to the present disclosure are shown below in Table 1. Table 1 identifies the combination of materials and their respective amounts, in ranges, according to the present disclosure. The glass-ceramic precursor compositions in Table 1 may include additional components according to an aspect of the present disclosure as described herein.

TABLE 1

Glass-Ceramic Precursor Composition

| Component | Amount Ranges |
| --- | --- |
| $SiO_2$ | about 45 wt % to about 65 wt % |
| $Al_2O_3$ | about 14 wt % to about 28 wt % |
| MgO | about 4.5 wt % to about 12 wt % |
| ZnO | about 0.1 wt % to about 4 wt % |
| $TiO_2$ | about 2 wt % to about 4 wt % |
| $ZrO_2$ | about 3 wt % to about 4.5 wt % |

In some aspects, glass-ceramic articles made from the glass-ceramic precursor compositions of Table 1 according to aspects of the present disclosure have a CTE of about $20 \times 10^{-7} K^{-1}$ to about $160 \times 10^{-7} K^{-1}$, about $20 \times 10^{-7} K^{-1}$ to about $150 \times 10^{-7} K^{-1}$, or about $20 \times 10^{-7} K^{-1}$ to about $135 \times 10^{-7} K^{-1}$, optionally a CTE range that is defined from a lower end of about $20 \times 10^{-7} K^{-1}$ to about $30 \times 10^{-7} K^{-1}$ to an upper end of about $55 \times 10^{-7} K^{-1}$ to about $160 \times 10^{-7} K^{-1}$, about $55 \times 10^{-7} K^{-1}$ to about $150 \times 10^{-7} K^{-1}$, or about $55 \times 10^{-7} K^{-1}$ to about $135 \times 10^{-7} K^{-1}$, in combination with an elastic modulus greater than 80 GPa, optionally within the range of about 80 GPa to about 100 GPa, further optionally within the range of about 80 GPa to about 140 GPa.

The glass-ceramic precursor composition of Table 1 can be used to form glass-ceramic articles according the present disclosure having a CTE of about $20 \times 10^{-7} K^{-1}$ to about $160 \times 10^{-7} K^{-1}$, about $20 \times 10^{-7} K^{-1}$ to about $150 \times 10^{-7} K^{-1}$, or about $20 \times 10^{-7} K^{-1}$ to about $135 \times 10^{-7} K^{-1}$, optionally a CTE range that is defined from a lower end of about $20 \times 10^{-7} K^{-1}$ to about $30 \times 10^{-7} K^{-1}$ to an upper end of about $55 \times 10^{-7} K^{-1}$ to about $160 \times 10^{-7} K^{-1}$, about $55 \times 10^{-7} K^{-1}$ to about $150 \times 10^{-7} K^{-1}$, or about $55 \times 10^{-7} K^{-1}$ to about $135 \times 10^{-7} K^{-1}$, in combination with an elastic modulus greater than 80 GPa, optionally within the range of about 80 GPa to about 100 GPa, further optionally within the range of about 80 GPa to about 140 GPa, and further in combination with an optical transmittance of at least about 75% at a wavelength of 1060 nm for an article having a thickness of less than about 1 mm.

In some aspects, the glass-ceramic article made from the glass-ceramic precursor composition of Table 1 according to aspects of the present disclosure includes an α-quartz crystalline and/or a β-quartz crystalline phase, optionally an α-quartz and β-quartz crystalline phase defined by a range of ratios of an α-quartz crystalline phase to a β-quartz crystalline phase, preferably a range defined by a lower end of about 0.3:1 and an upper end of about 74:0, in combination with at least one of the following features: a CTE of about $20 \times 10^{-7} K^{-1}$ to about $160 \times 10^{-7} K^{-1}$, about $20 \times 10^{-7} K^{-1}$ to about $150 \times 10^{-7} K^{-1}$, or about $20 \times 10^{-7} K^{-1}$ to about $135 \times 10^{-7} K^{-1}$; a CTE range that is defined from a lower end of about $20 \times 10^{-7} K^{-1}$ to about $30 \times 10^{-7} K^{-1}$ to an upper end of about $55 \times 10^{-7} K^{-1}$ to about $160 \times 10^{-7} K^{-1}$, about $55 \times 10^{-7} K^{-1}$ to about $150 \times 10^{-7} K^{-1}$, or about $55 \times 10^{-7} K^{-1}$ to about $135 \times 10^{-7} K^{-1}$; an elastic modulus greater than 80 GPa; an elastic modulus within the range of about 80 GPa to about 100 GPa; an elastic modulus greater than about 100 GPa; and/or an optical transmittance of at least about 75% at a wavelength of 1060 nm for an article having a thickness of less than about 1 mm.

The range of CTE values provided by the glass-ceramic articles of the present disclosure facilitate their use in a variety of different electronic devices, such as semi-conductors, displays, and sensors, and the processes for making these devices. In one aspect, the glass-ceramic articles of the present disclosure can be utilized as a carrier substrate in an electronic device. A carrier substrate is a temporary substrate used during production of the electronic device, but which is ultimately removed and does not form a part of the final product. For example, the glass-ceramic articles of the present disclosure can be utilized as a carrier substrate for a semi-conductor chip in a semi-conductor packaging process. In another aspect, the glass-ceramic articles of the present disclosure can be utilized as the substrate in an electronic device, which remains part of the final product. For example, the glass-ceramic articles of the present disclosure can be utilized as a substrate for a semi-conductor chip in a semi-conductor packaging process. The present disclosure provides glass-ceramic articles having a tunable range of CTE values that are useful both in processes for forming electronic devices in which the glass-ceramic article is utilized as a carrier substrate that does not remain as part of the final product and in processes in which the glass-ceramic article is utilized as a substrate which forms a part of the final product.

Referring now to FIG. 1, a method 10 for forming a glass-ceramic article according to the present disclosure is illustrated. Aspects of the present disclosure include methods for forming glass-ceramic articles having an adjustable CTE that can be used in a variety of electronic devices, non-limiting examples of which include semi-conductors, displays, and sensors. The methods of the present disclosure generally relate to customizing the CTE of a glass-ceramic article within a range of values by adjusting parameters of the heating process, without changing the components of the composition.

The method 10 can include a step 12 of forming the glass-ceramic precursor. Forming the glass-ceramic precursor includes combining the raw materials, including at least the oxides $SiO_2$, $Al_2O_3$, $TiO_2$, $ZrO_2$, MgO, and ZnO, and melting the materials according to glass melting processes known in the art. In order to improve the quality of the glass and to limit the formation of cords, it has been found efficient to perform a double melting of the glass: after the first melt the glass is poured in water. The obtained cullet is then remelted. The glass can be formed by rolling, pressing, or casting, followed by an optional annealing process.

The thus formed glass-ceramic precursor can then be subjected to a heating process 14 to induce crystallization and form a glass-ceramic article. The heating process 14 can be considered as including two phases—a first heating phase 16 and a second heating phase 18. In one aspect, the heating process 14 can be a ceramming process in which the first heating phase 16 is a nucleation phase and the second heating phase 18 is a heat treatment phase.

During the first heating phase 16, the glass-ceramic precursor can be heated to and held at a first predetermined temperature for a predetermined first period of time. The heating during the first heating phase 16 may induce internal nucleation. The first predetermined temperature can be in the range of about 600° C. to about 900° C., about 600° C. to about 800° C., about 700° C. to about 900° C., about 700° C. to about 800° C., about 800° C. to about 900° C., or about 800° C. The first period of time can be in the range of about 60 minutes to about 240 minutes, about 60 minutes to about 180 minutes, about 60 minutes to about 120 minutes, about 120 minutes to about 240 minutes, about 120 minutes to about 180 minutes, about 120 minutes, or about 240 minutes. Subsequent to the first heating phase 16, the glass-ceramic precursor can be treated according to the second heating phase 18.

During the second heating phase 18, the glass-ceramic precursor can be heated to a second temperature and held at the second temperature for a second period of time. The temperature during the second heating phase 18 and/or the duration of the second period of time can be varied to adjust the CTE of the glass-ceramic article end product. In general, increasing the temperature and/or lengthening the second period of time during the second heating phase 18, increases the CTE of the formed glass-ceramic article. According to one aspect of the disclosure, the second temperature during the second heating phase 18 is higher than the first temperature during the first heating phase 16. In one example, the second temperature during the second heating phase 18 is greater than 950° C., greater than 1000° C., greater than 1100° C., in the range of about 950° C. to about 1200° C., in the range of about 950° C. to about 1100° C., or in the range of about 950° C. to about 1000° C., in the range of about 1000° C. to about 1200° C., or in the range of about 1000° C. to about 1100° C. In another aspect, the second period of time during second heating phase 18 is greater than 45 minutes, greater than 60 minutes, within the range of about 45 minutes to about 300 minutes, within the range of about 45 minutes to about 240 minutes, within the range of about 60 minutes to about 300 minutes, or within the range of about 60 minutes to about 240 minutes.

The temperature and time parameters for the first heating phase 16 can be selected in combination with the temperature and time parameters of the second heating phase 18 to provide the desired CTE value after completion of the heating process 14. The parameters of the heating process 14, including the temperature and/or the period of time the precursor is heated in each of the first and second heating phases 16 and 18, can be selected to provide glass-ceramic articles having a variety of different CTE values within the range of about $20\times10^{-7}K^{-1}$ to about $160\times10^{-7}K^{-1}$, optionally from a lower end of about $20\times10^{-7}K^{-1}$ to about $30\times10^{-7}K^{-1}$ to an upper end of about $55\times10^{-7}K^{-1}$ to about $160\times10^{-7}K^{-1}$, utilizing the same glass-ceramic precursor composition. The parameters of the heating process 14 can also be selected to provide glass-ceramic articles having a range of α-quartz crystalline and/or β-quartz crystalline microstructure contents utilizing the same glass-precursor composition.

Optionally, the heating process 14 is carried out on blocks, as opposed to individual wafers, and the wafers are subsequently cut from the blocks, such as by a wire saw. Heating blocks instead of individual wafer may decrease the likelihood of warping that could occur due to differences between surface crystallization and bulk crystallization.

The method 10 may include a cooling phase 20 subsequent to the heating process 14. In one aspect, the cooling phase 20 may be a passive process in which thermal energy is no longer applied to the sample and the sample is allowed to come to equilibrium with ambient temperature. According to another aspect, the cooling phase 20 may be an active process which facilitates the transfer of thermal energy from the sample, such as exposing the sample to a cooling medium. Optionally, the cooling phase 20 is controlled to promote uniform transformation of the β-quartz crystalline phase to the α-quartz crystalline phase. Non-uniform phase transformation can induce high residual stress in the sample, which could result in breakage or warpage of the sample. According to one aspect, uniform transformation of the β-quartz crystalline phase to the α-quartz crystalline phase can be facilitated during the cooling phase 20 by utilizing a slow cooling rate or a temperature hold within a temperature domain in which the transformation occurs.

EXAMPLES

The following examples describe various features and advantages provided by the disclosure, and are in no way intended to limit the invention and appended claims.

Glass-Ceramic Precursor Preparation

Glass-ceramic precursors for the exemplary and comparative examples were prepared in the same manner as described below. The raw materials were mixed for producing batches of 1 kg of precursor glass. The mixtures were placed in platinum crucibles for melting and refining; the mixtures were melted at 1650° C. for 4 hours. After melting, the glass was rolled to a thickness of 6 mm and annealed at 760° C. for 1 hour. The prepared precursor samples were then treated as described below.

Example 1

Table 2 below illustrates an exemplary Composition 1 according to the present disclosure.

TABLE 2

| Exemplary Composition 1 | | |
|---|---|---|
| Component | Amount (wt %) | Amount (mol %) |
| $SiO_2$ | 62.45 | 69.39 |
| $Al_2O_3$ | 20.11 | 13.17 |
| MgO | 6.09 | 10.08 |
| ZnO | 2.48 | 2.04 |
| BaO | 2.22 | 0.97 |
| $TiO_2$ | 2.65 | 2.04 |
| $ZrO_2$ | 3.76 | 2.22 |
| $SnO_2$ | 0.23 | 0.10 |
| Sum | 99.99 | 100.00 |

Composition 1 was used to form glass-ceramic precursor samples as described above, which were subsequently treated according to the heating process parameters indicated below in Table 3. Samples A-H were subjected to a heating process as indicated in Table 3, which in the present example can be considered a ceramming process. The ceramming process includes two heating phases: a first heating phase and a second heating phase, which in the present example can be considered a nucleation phase and a heat treatment phase. During the nucleation phase, the sample was heated to a first temperature and held at the first temperature for the indicated period of time. During the subsequent heat treatment phase, the sample was heated to the indicated temperature and held at the indicated temperature for the indicated period of time. Heating rates during ceramming were 10° C./min. and cooling occurred at the rate the furnace cooled. After the samples had cooled following the ceramming process, the CTE for Samples A-H was measured using dilatometry and is presented as an average over two different temperature ranges, 25° C. to 260° C. and 25° C. to 300° C.

TABLE 3

Treatment Process and CTE values for Exemplary Composition 1 Samples

| | Ceramming | | CTE × $10^{-7}K^{-1}$ | CTE × $10^{-7}K^{-1}$ |
|---|---|---|---|---|
| Sample | Nucleation | Heat Treatment | (25-260° C.) | (25-300° C.) |
| A | No | No | 26 | 27 |
| B | 2 hrs, 800° C. | No | 26 | 27 |
| C | 4 hrs, 800° C. | No | 26 | 27 |
| D | 2 hrs, 800° C. | 4 hrs, 948° C. | 37 | 36 |
| E | 2 hrs, 800° C. | 1 hr, 1000° C. | 29 | 28 |
| F | 2 hrs, 800° C. | 90 min., 1000° C. | 58 | 55 |
| G | 2 hrs, 800° C. | 2 hrs, 1000° C. | 78 | 76 |
| H | 2 hrs, 800° C. | 4 hrs, 1000° C. | 100 | 100 |
| I | 2 hrs, 800° C. | 4 hrs, 1025° C. | 121 | 124 |
| J | 2 hrs, 800° C. | 4 hrs, 1050° C. | 131 | 136 |

TABLE 3-continued

Treatment Process and CTE values for Exemplary Composition 1 Samples

| | Ceramming | | CTE × $10^{-7}K^{-1}$ | CTE × $10^{-7}K^{-1}$ |
|---|---|---|---|---|
| Sample | Nucleation | Heat Treatment | (25-260° C.) | (25-300° C.) |
| K | 2 hrs, 800° C. | 4 hrs, 1080° C. | 132 | 139 |
| L | 2 hrs, 800° C. | 4 hrs, 1090° C. | 131 | 135 |

Referring again to Table 3, Sample A is the green glass sample which has not been heated according to the nucleation or heat treatment phases. Samples B and C were subjected to the nucleation phase heat treatment for the indicated times, but not the subsequent heat treatment phase. As demonstrated in Table 3, the CTE for Samples A, B, and C did not change, even as the length of time of the nucleation phase increased.

Samples D through L demonstrate the effect of the temperature and duration of the heat treatment phase on the CTE of the samples. Samples D through L were all treated according to the same nucleation phase parameters, however, each sample was treated at a different temperature and/or time during the subsequent heat treatment phase. Sample D demonstrates that even at a long heating period of 4 hours during the heat treatment process at a temperature less than 950° C., the CTE only shows a modest increase.

Figure 2:
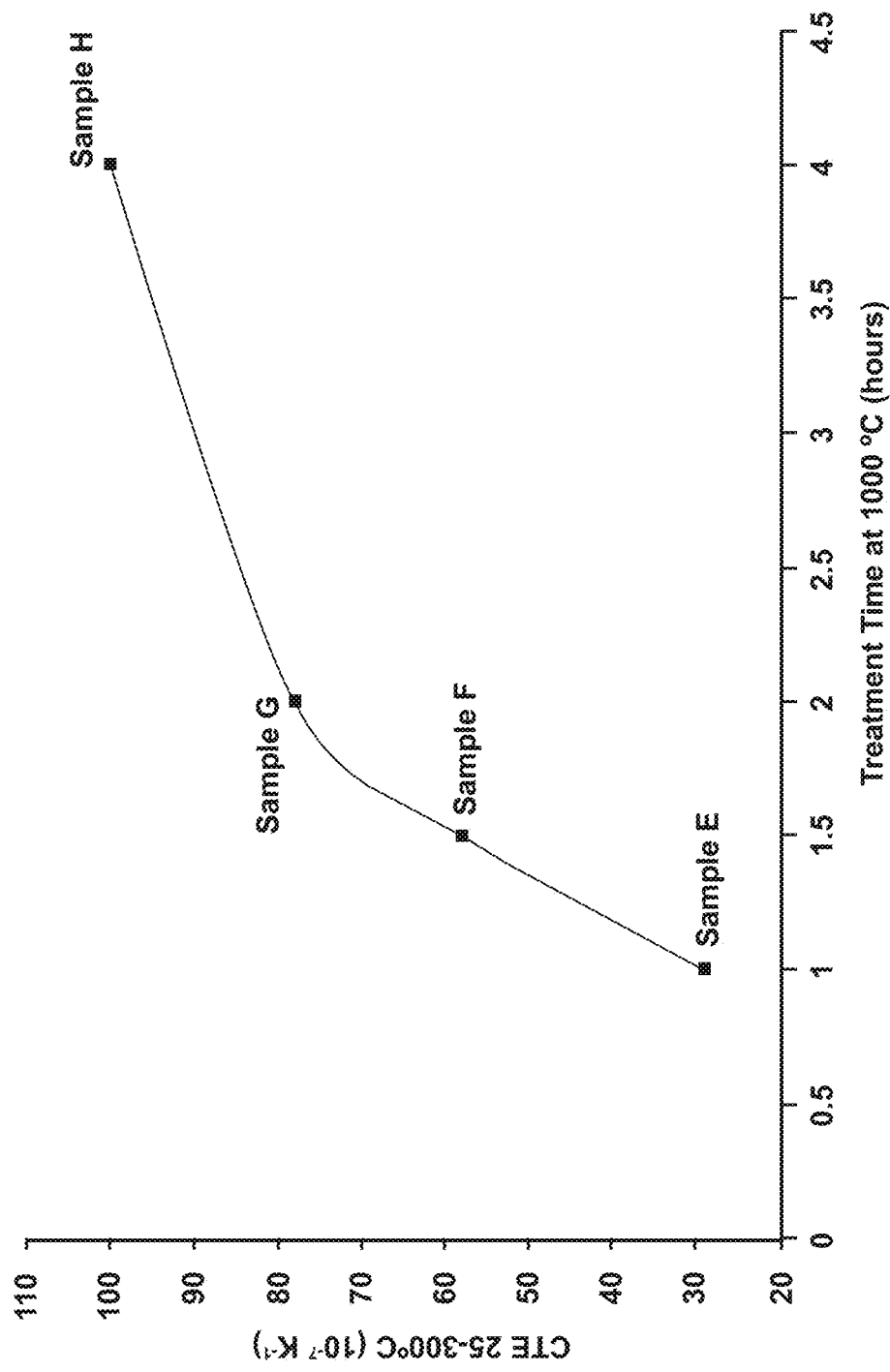
FIG. 2 is a plot of coefficient of thermal expansion (CTE) values vs. heat treatment time for four glass-ceramic articles, according to aspects of the present disclosure.

The CTE of Samples E through L show a progressive increase over a wide range based on an increase in the duration of the heat treatment phase and/or based on an increase temperature to 1000° C. or greater during the heat treatment phase. FIG. 2 illustrates the effect of the duration of the heat treatment at 1000° C. for Samples E through H. Samples E through H demonstrate an incremental increase in CTE values over a wide range from $27\times10^{-7}K^{-1}$ to $100\times10^{-7}K^{-1}$ as the duration of a heat treatment phase at 1000° C. incrementally increases. Samples I though L demonstrate an additional incremental increase in CTE values as the temperature during the heat treatment phase is increased above 1000° C. Samples A through L demonstrate the ability of Composition 1 to form glass-ceramic articles having a CTE that can be adjusted over a wide range, including intermediate values, based on the parameters of a heat treatment phase during the ceramming process. The exemplary range of $27\times10^{-7}K^{-1}$ to $135\times10^{-7}K^{-1}$, including intermediate values, demonstrated by Composition 1 overlaps with the range of CTE values typically required in semiconductor packaging processes and thus provides a single glass-ceramic article composition that can be customized to meet a range of processing and product requirements.

Example 2

XRD analysis was performed on Samples E, G, and H of the Exemplary Composition 1 of Example 1 and the results are illustrated in Table 4 below. XRD analysis was performed on samples that had been polished after ceramming using a Bragg-Brentano configuration. Rietveld analysis was performed to determine the respective amounts of the crystalline phases and the Al/Si ratio of the α-quartz and β-quartz crystalline phases. The amount of residual glasses has not been measured.

TABLE 4

| XRD Analysis of Samples E, G, and H | | | | |
|---|---|---|---|---|
| Sample | Nucleation; Heat Treatment | a-quartz (Al/Si ratio) | β-quartz (Al/Si ratio) | Spinel and/or Gahnite | Srilankite |
| E | 2 hrs, 800° C.; 1 hr, 1000° C. | 21.4 wt % (0.042) | 64.4 wt % (0.379) | 8 wt % | 6.3 wt % |

TABLE 4-continued

XRD Analysis of Samples E, G, and H

| Sample | Nucleation; Heat Treatment | α-quartz (Al/Si ratio) | β-quartz (Al/Si ratio) | Spinel and/or Gahnite | Srilankite |
|---|---|---|---|---|---|
| G | 2 hrs, 800° C.; 2 hr, 1000° C. | 49.4 wt % (0.02) | 28.4 wt % (0.32) | 15.3 wt % | 6.9 wt % |
| H | 2 hrs, 800° C.; 4 hr, 1000° C. | 73.7 wt % (0.017) | 0 wt % | 20.1 wt % | 6.2 wt % |

The data in Table 4 demonstrates that the amount of α-quartz crystalline phase increases and the amount of β-quartz crystalline phases decreases as the length of time of the heat treatment at 1000° C. increases. The data also demonstrates a concomitant increase in the amount of spinel and/or gahnite crystalline phases as the length of time of the heat treatment at 1000° C. increases. Sample E, which has 1 hour heat treatment at 1000° C., exhibits a β-quartz crystalline main phase with minor α-quartz, spinel/gahnite, and srilankite phases. Increasing the duration of the heat treatment at 1000° C. results in a decrease in the amount of β-quartz and an increase in the amount of α-quartz and spinel/gahnite phases. The data also demonstrates that the ratio of Al/Si in the α-quartz crystalline phase is low (i.e., a low amount of "stuffing") compared to the Al/Si in the β-quartz crystalline phases (i.e., a high amount of stuffing).

The data presented in Tables 3 and 4 demonstrate a relationship between the increase in the observed CTE of the samples as the duration of the heat treatment at 1000° C. increases and a concomitant decrease in the β-quartz crystalline phase and increase in the α-quartz crystalline phase present in the sample. Without being bound by any theory, the mechanism of α-quartz formation in the samples is believed to be based on several factors, including the components of the composition and the parameters of the heat treatment. $TiO_2$ and $ZrO_2$ are believed to be acting as nucleating agents that favor the crystallization of β-quartz solid solution. The crystalline phase is stuffed, meaning that the β-quartz includes a significant amount of aluminum replacing silicon. To maintain the charge balance, magnesium fills the interstitial vacancies. The high amount of "stuffing" inhibits the inversion of the β-quartz to α-quartz that would normally occur during cooling following the ceramming process. Sample E generally corresponds to this state of crystallization, which also includes minor amounts of srilankite and gahnite. Generally, β-quartz as the main phase results in a CTE around $30\times10^{-7}K^{-1}$. As the temperature and/or the duration of time of the heat treatment phase increases, spinel ($MgAl_2O_4$) forms and the β-quartz crystals transition toward pure silica and are depleted in aluminum and magnesium. The β-quartz crystals rich in silica transform to α-quartz during cooling. The CTE of pure α-quartz is around $150\times10^{-7}K^{-1}$. Thus, it is theorized that the progressive inversion of β-quartz to α-quartz that occurs as a result of the increase in temperature and/or the duration of time of the heat treatment phase is at least in part responsible for the progressive and incremental increase in the CTE.

Figure 3:
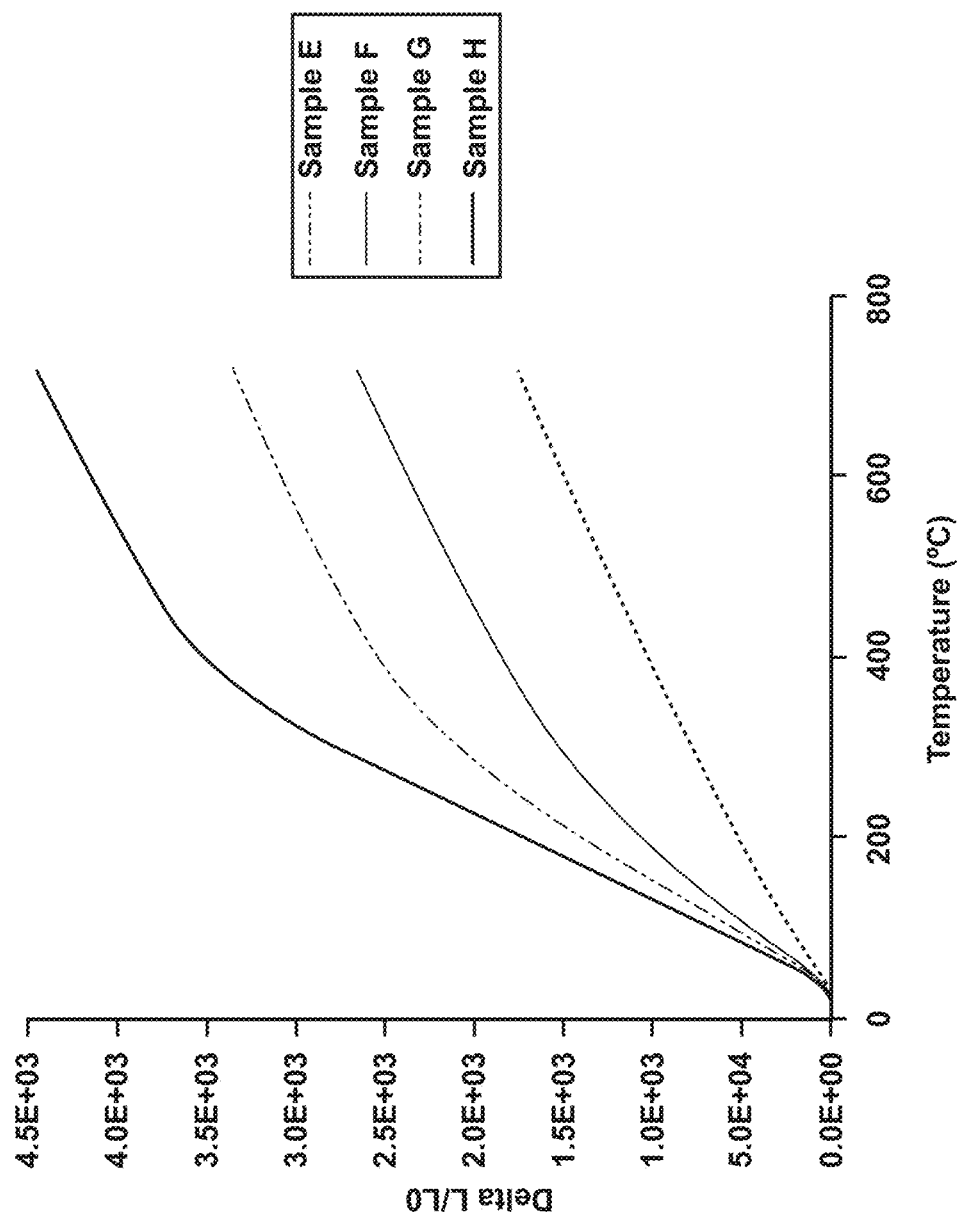
FIG. 3 is a plot of a variation in length of glass-ceramic articles vs. temperature for glass-ceramic articles treated for different periods of time in a heat treatment phase in a heating process, according to aspects of the present disclosure.

Referring now to FIG. 3, the variation in length for Samples E through H is demonstrated as a function of temperature. It is theorized that the variation in slope of each curve at around 300° C. is related to the α-quartz to β-quartz phase transition.

Example 4

Figure 4:
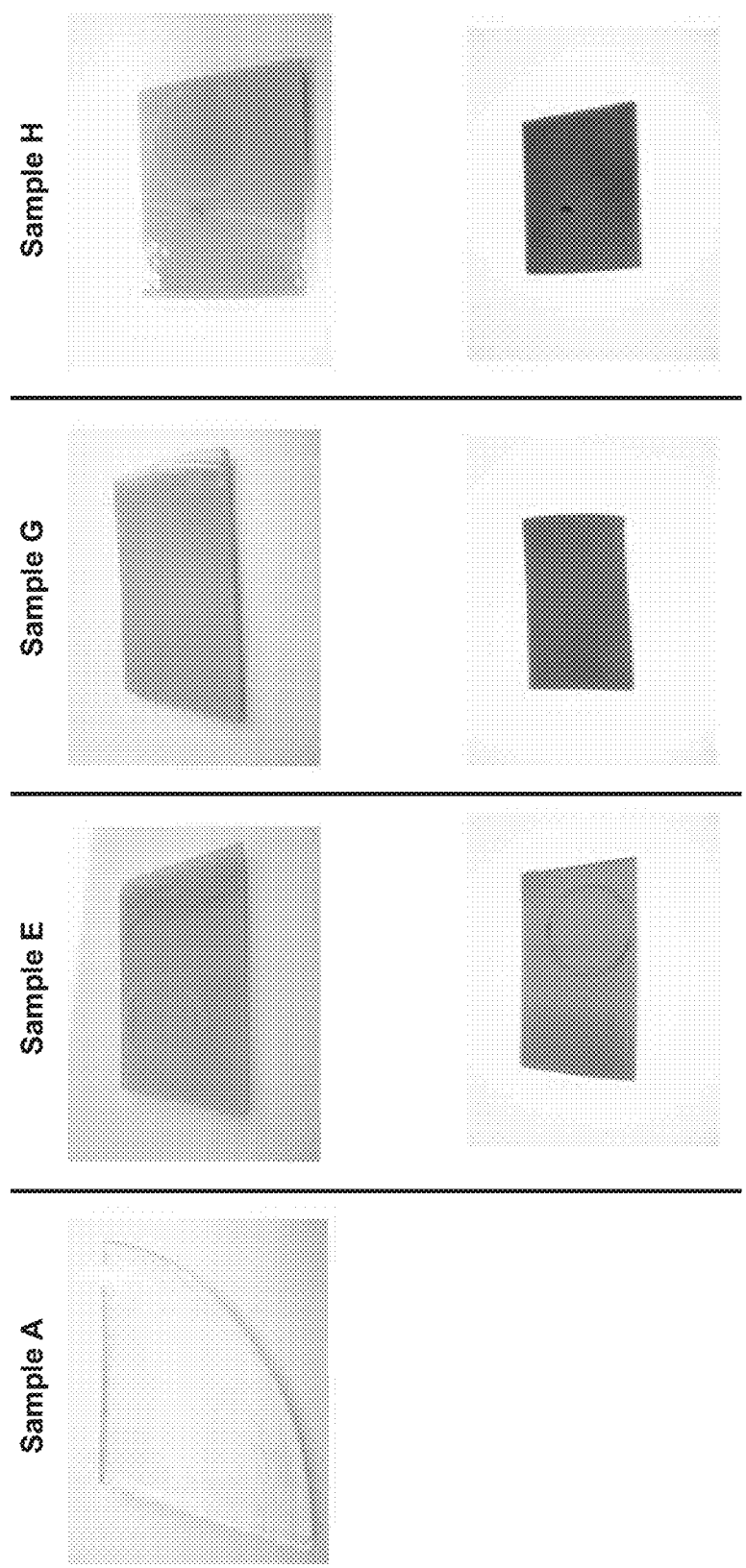
FIG. 4 is a series of photographs illustrating the transparency of an untreated green glass sample and glass-ceramic articles treated according to a heating process of the present disclosure, according to aspects of the present disclosure.

The glass-ceramic samples of the present disclosure also exhibit at least partial transparency to visible light. Transmission measurements were performed on 1.3 mm thick polished samples. FIG. 4 demonstrates the transparency of Sample A (green glass) and Samples E, G, and H of the Exemplary Composition 1 of Example 1. The bottom image in each column has been illuminated from below to demonstrate the increase in opacity as the duration of the heat treatment phase at 1000° C. increases from Sample E to Sample H.

Example 5

Figure 5:
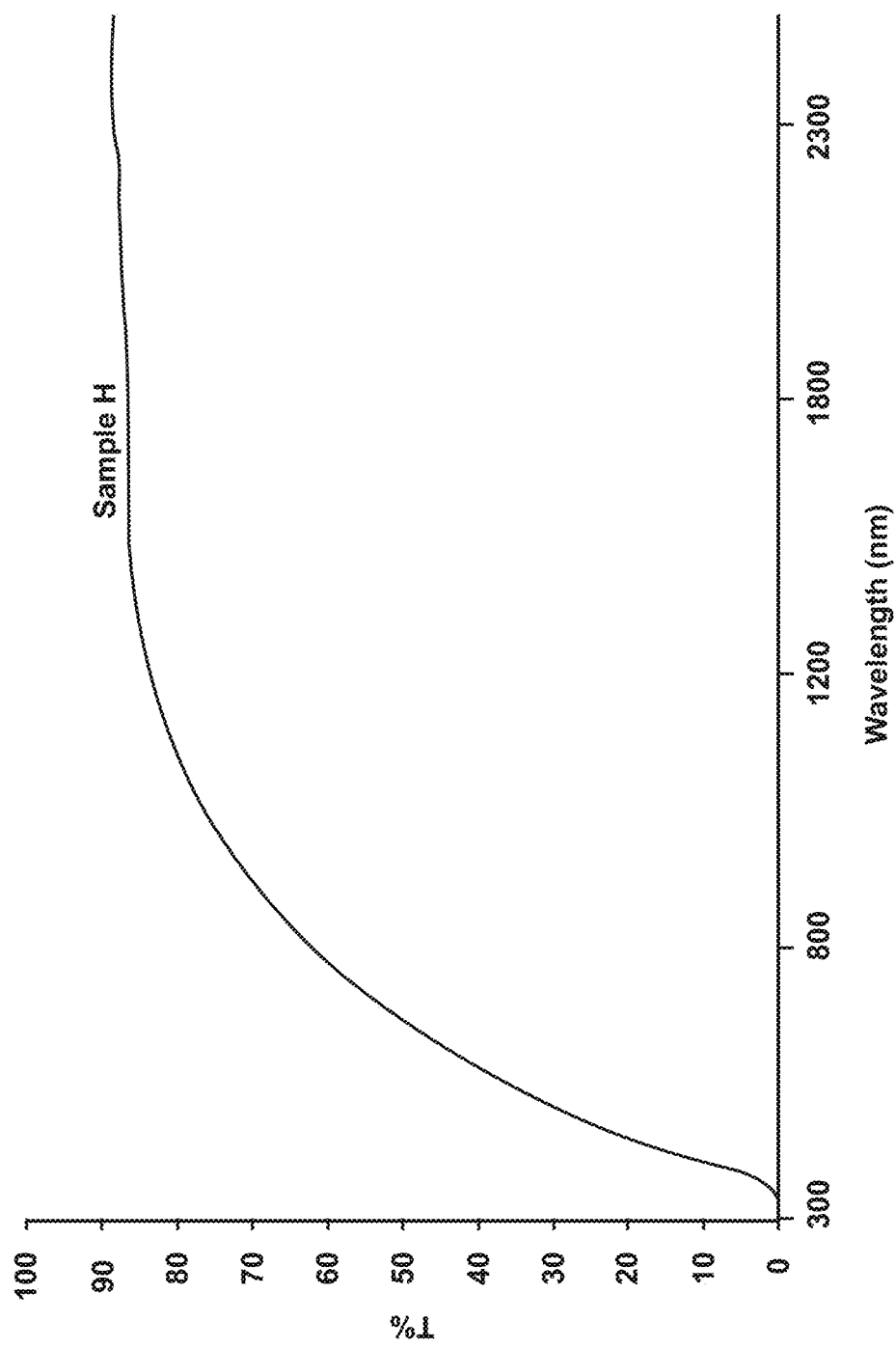
FIG. 5 is a plot of the percent transmission vs. wavelength of electromagnetic radiation for a glass-ceramic article, according to aspects of the present disclosure.

The glass-ceramic samples of the present disclosure also exhibit transmission of infrared wavelength light. Transmission measurements were performed on 1.3 mm thick polished samples with a spectrophotometer equipped with an integrating sphere to allow for measurement of both the direct and diffuse transmission of light having a wavelength from about 300 nm to about 2500 nm. FIG. 5 illustrates the optical transmission for Sample H, which was heated at 1000° C. for 4 hours during the heat treatment process. Sample H demonstrates a total transparency (both diffuse and direct) of at least 75% at wavelengths of about 1060 nm and greater. As illustrated in FIG. 4 of Example 4, Sample H is the most opaque of Samples E through G and thus it would be expected that Samples E through G exhibit similar, if not greater, optical transmission. High transparency to electromagnetic radiation in the infrared portion of the spectrum, particularly in the near-IR range, can be useful in semiconductor packaging processes that utilize a laser to de-bond the substrate. Transparency of at least about 75% at wavelengths of about 1060 nm would generally satisfy the requirements for a laser de-bonding process.

Example 6

The liquidus temperatures of the glass-ceramic precursor formed from Composition 1 were measured using pieces having a volume around 0.5 $cm^{-3}$. The pieces were treated as follows: introduce the sample into a furnace that has been preheated to 1550° C.; heat the sample at 1550° C. for 30 minutes; decrease the furnace temperature to the test temperature at a rate of 10° C./min.; maintain the furnace at the test temperature for 17 hours; and air quench the samples.

The presence of crystals was studied using optical microscopy and a temperature range and associated viscosity range is given as liquid. The maximum temperature corresponds to the minimum temperature of test at which no crystals were observed; the minimum temperature corresponds to the maximum temperature of test at which crystals were observed. The nature of the crystalline phase which devitrifies at the liquidus temperature was also determined.

The glass-ceramic precursor of Composition 1 exhibited a viscosity of 200 Pa t 1600° C. and has a liquidus temperature in the range of about 1425° C. to about 1444° C., which corresponds to a viscosity at the liquidus in the range of about 1200 P to about 1400 P. The primary phase of the glass-ceramic precursor of Composition 1 is zircon.

Example 7

Table 5 below illustrates additional Exemplary Compositions 2, 3, and 4 according to the present disclosure. Differences between Composition 1 and Compositions 2 to 4 are shown for the purpose of discussion. Compositions 2, 3, and 4 were used to make glass-ceramic precursor samples and glass-ceramic articles in a manner similar to that described above in Example 1 with respect to Composition 1. The CTE of the glass-ceramic articles formed using Compositions 2 to 4 were determined as described above in Example 1. The crystalline microstructure and optical transmission characteristics of the articles formed with Compositions 2 to 4 were determined as described above in Examples 3 and 4, respectively.

Articles were formed from each of Exemplary Compositions 1 through 5 according to a ceramming process that included heating at 800° C. for 2 hours during the nucleation phase followed by the heat treatment phase indicated in Table 5.

still provides a range of CTE values within which the glass-ceramic article can be customized based on processing requirements.

Composition 4 illustrates the effect of adding a rare-earth oxide to the composition. The presence of $La_2O_3$ in Composition 4 produces a glass-ceramic article that is opaque and has a relatively low CTE value compared to Composition 1. However, the glass-ceramic article of the Composition 4 does demonstrate a range of CTE values, albeit a smaller range than that demonstrated by Composition 1. Thus, Composition 4 may be used to provide a customizable CTE in processes in which a smaller range, up to about $58 \times 10^{-7}$ $K^{-1}$ is sufficient.

Composition 4 displays both α-quartz and β-quartz in the main crystalline phase after a heat treatment at 1000° C. for 4 hours compared to similarly treated Composition 1, which exhibits α-quartz as the main crystalline phase and spinel as the minor phase, in the absence of a β-phase. It is theorized that the smaller CTE range exhibited by Composition 4 compared to Composition 1 is in part related to the presence of a β-quartz phase remaining in Composition 4, even after the longer heat treatment. When a sample of Composition 4

TABLE 5

Exemplary Compositions 1 through 5

| | Composition 1 (wt %) | Composition 2 (wt %) | Composition 3 (wt %) | Composition 4 (wt %) | Composition 5 (wt %) |
|---|---|---|---|---|---|
| $SiO_2$ | 62.45 | 62.79 | 60.30 | 60.14 | 64.24 |
| $Al_2O_3$ | 20.11 | 20.22 | 19.42 | 19.37 | 20.69 |
| K2O | — | — | — | — | |
| MgO | 6.09 | 6.13 | 4.70 | 5.87 | 6.27 |
| ZnO | 2.48 | 2.49 | 2.4 | 1.19 | 2.55 |
| BaO | 2.22 | 2.23 | 6.66 | 2.14 | 1.4 |
| $TiO_2$ | 2.65 | 3.67 | 2.35 | 2.34 | 2.5 |
| $ZrO_2$ | 3.76 | 2.23 | 3.95 | 3.94 | 2.11 |
| $Y_2O_3$ | — | — | — | — | |
| $La_2O_3$ | — | — | — | 4.78 | |
| $P_2O_5$ | — | — | — | — | |
| $SnO_2$ | 0.23 | 0.23 | 0.22 | 0.22 | 0.24 |
| Sum | 99.99 | 99.99 | 100.00 | 100.00 | 100.00 |
| Heat Treatment | 4 hrs, 1000° C. | 4 hrs, 1060° C. | 4 hrs, 1000° C. | 4 hrs, 1000° C. | 4 hrs, 1050° C. |
| CTE (25-300° C.) | $100 \times 10^{-7} K^{-1}$ | $129 \times 10^{-7} K^{-1}$ | $65 \times 10^{-7} K^{-1}$ | $58 \times 10^{-7} K^{-1}$ | $90 \times 10^{-7} K^{-1}$ |
| Optical Character | Opalescent | Opaque | Opaque | Opaque | Opaque |

Composition 2 differed from Composition 1 in that the amount of $TiO_2$ was increased and the amount of $ZrO_2$ was decreased, while the total combined amount of $TiO_2$ and $ZrO_2$ remained above 5 wt %. While Composition 2 produced a glass-ceramic article that was opaque, the CTE was high, indicative of a large range within which the CTE could be adjusted to meet specific CTE requirements (e.g., by adjusting the heat treatment process step). Thus, Composition 2 could be used in processes in which a large CTE range was required and where transparency was not a requirement.

Composition 3 illustrates the effect of decreasing the amount of MgO compared to Composition 1 while maintaining the ZnO content within the preferred range of about 0.1 wt % to about 4 wt %. Composition 3 produced a glass-ceramic article that was opaque and had a lower CTE value compared to Composition 1. However, Composition 3 was treated for 4 hours at 1050° C., an additional increase in the CTE value was obtained ($143 \times 10^{-7} K^{-1}$). At this higher temperature treatment, the sample of Composition 4 exhibited a further increase in the α-quartz content and decrease in the β-quartz content in addition to the presence of a cristobalite crystalline phase.

Composition 5 displays a relatively low level of TiO2+ ZrO2. It produces after a thermal treatment at a temperature of 1050° C. an opaque glass-ceramic with a relatively high CTE (90×10-7 K-1).

In some embodiments, Composition 1 is melted in larger quantities (e.g. batch quantity of 68 Kg) at 1650° C. and then annealed at 740° C. The resulting pieces of glasses are heat treated in different conditions as indicated in the table below. Heating was performed at 10° C./min. XRD and CTE measurements were performed after ceramming and the results are shown in Table 6 below.

TABLE 6

| Example | A' | B' | C' | D' |
|---|---|---|---|---|
| Nucleation Temperature | 2h 800° C. | 2h 820° C. | 2h 770° C. | 2h 770° C. |
| High temperature hold | 1h 1000° C. | 1h 1000° C. | 1h 1000° C. | 8h 1000° C. |
| CTE ($10^{-7}K^{-1}$) 25-300° C. | 76 | 38 | 27 | 82 |
| XRD | | Low amount of crystallization; Main phases: spinel/gahnite and α-quartz | Main phase: β-quartz solid solution Minor phases: α-quartz, gahnite, TiZrO$_4$ | Main phase: α-quartz, Minor phases: gahnite, β-quartz solid solution |

The results show that the nucleation temperature has a strong influence on the crystallization of the glass-ceramic with improved nucleation occurring within a temperature range of about 770° C. to about 800° C. Nucleation at 820° C. (example C') leads to a material with a very high amount of residual glass (low amount of crystallization).

A comparison of examples A' and C' shows that the nucleation temperature (in the 770-800° C. range) has an influence on the kinetic of crystallization. Example A' nucleated at 800° C. displays a CTE of 76 $10^{-7}K^{-1}$ which suggests that the glass-ceramic contains already a significant amount of α-quartz while Example C' nucleated at 770° C. contains β-quartz solid solution as main crystalline phase (associated to a low CTE). In this last case a longer hold at high temperature allows a higher transformation to α-quartz and to increase the CTE (example D')

The glass obtained from Composition 1 was also used for mechanical testing. Polished samples with a diameter of 32 mm and a thickness of 3 mm were prepared and heat treated with the following cycle: 2 hours at 800° C.+1.5 hour at 1000° C. (heating rates: 10° C./min, cooling rate: 1° C./min). The mechanical performances of the glass-ceramics were measured by a ring on ring test. This test evaluates the biaxial flexure strength. Two series of samples were broken: (1) the samples as made and (2)—samples repolished after thermal treatment in order to remove the surface. For each condition at least ten samples were broken. The results are given in the following table. The Weibull modulus and scale parameters corresponding to strength at failure are reported. The Weibull modulus corresponds to 63.2% of failure probability.

TABLE 7

| Sample | As made | Repolished |
|---|---|---|
| Weibull modulus | 315 MPa | 98 MPa |
| Slope | 4 | 4 |

The "as made" samples display a much higher Weibull modulus than the repolished ones. Without being bound by theory, the inventors believe that there is a difference of crystallization between the surface and the bulk, with the surface richer in β-quartz solid solution than the bulk, which is more transformed into α-quartz. Consequently, the CTE is lower at the surface which induces compressive stresses at the surface which leads to an increase of the Weibull modulus.

Example 8

Table 8 below illustrates comparative glass-ceramic article compositions, Comparative Examples 1 through 4. Differences between Exemplary Composition 1 and Comparative Examples 1 through 4 are shown for the purpose of discussion. Glass-ceramic precursor samples and glass-ceramic articles were formed in a manner similar to that described above in Example 1 with respect to Exemplary Composition 1. The CTE of the glass-ceramic articles formed using Comparative Examples 1 through 4 were determined as described above in Example 1. The crystalline microstructure and optical transmission characteristics of the articles formed with Comparative Examples 1 through 4 was determined as described above in Examples 3 and 4, respectively.

Articles were formed from each composition according to a ceramming process that included heating at 800° C. for 2 hours during the nucleation phase followed by 5the heat treatment phase indicated in Table 8.

TABLE 8

| | Exemplary Composition 1 and Comparative Examples 1 through 4 | | | | |
|---|---|---|---|---|---|
| | Exemplary Composition 1 (wt %) | Comparative Example 1 (wt %) | Comparative Example 2 (wt %) | Comparative Example 3 (wt %) | Comparative Example 4 (wt %) |
| SiO$_2$ | 62.45 | 61.68 | 61.97 | 58.87 | 59.05 |
| Al$_2$O$_3$ | 20.11 | 19.87 | 19.96 | 18.96 | 19.02 |
| K$_2$O | — | — | — | — | — |
| MgO | 6.09 | 4.81 | 6.05 | 5.75 | 5.76 |
| ZnO | 2.48 | 4.9 | 2.46 | 2.34 | 2.35 |
| BaO | 2.22 | 2.19 | 2.20 | 2.09 | 2.10 |
| TiO$_2$ | 2.65 | 2.62 | 1.21 | 2.3 | — |
| ZrO$_2$ | 3.76 | 3.71 | 5.93 | 3.86 | 3.87 |

TABLE 8-continued

Exemplary Composition 1 and Comparative Examples 1 through 4

|  | Exemplary Composition 1 (wt %) | Comparative Example 1 (wt %) | Comparative Example 2 (wt %) | Comparative Example 3 (wt %) | Comparative Example 4 (wt %) |
|---|---|---|---|---|---|
| $Y_2O_3$ | — | — | — | 5.61 | — |
| $La_2O_3$ | — | — | — | — | — |
| $P_2O_5$ | — | — | — | — | 7.64 |
| $SnO_2$ | 0.23 | 0.23 | 0.23 | 0.22 | 0.22 |
| Sum | 99.99 | 100.01 | 100.01 | 100.00 | 100.00 |
| Heat Treatment | 4 hrs, 1000° C. | 4 hrs, 1000° C. | 4 hrs, 1000° C. | 4 hrs, 1000° C. | 4 hrs, 1000° C. |
| CTE (25-300° C.) | $100 \times 10^{-7} K^{-1}$ | $36 \times 10^{-7} K^{-1}$ | * | $34 \times 10^{-7} K^{-1}$ | $34 \times 10^{-7} K^{-1}$ |
| Optical Character | Opalescent | Opalescent | White opaque/batch stones | Opaque | Opalescent |

*Unable to measure CTE because of poor $ZrO_2$ dissolution.

Comparative Example 1 illustrates the effect of an increase in the amount of ZnO on characteristics of the formed glass-ceramic article. The amount of ZnO was almost double compared to the amount present in exemplary Composition 1 and was outside the preferred range of about 0.1 wt % to about 4 wt %. The CTE of the glass-ceramic article of Comparative Example 1 was only $36 \times 10^{-7} K^{-1}$ compared to a CTE value of $100 \times 10^{-7} K^{-1}$ for exemplary Composition 1 when subjected to a similar heat treatment process. The low CTE value of Comparative Example 1 does not provide a suitable window within which to provide a large range of customizable CTE values to satisfy a wide range of CTE process requirements.

Comparative Example 2 illustrates the effect of increasing the amount of $ZrO_2$ too much compared to exemplary Composition 1. Comparative Example 2 exhibited poor $ZrO_2$ dissolution and a CTE value could not be obtained.

The presence of $Y_2O_3$ in Comparative Example 3 produces a glass-ceramic article that is opaque and has a very low CTE value. The low CTE value exhibited by Comparative Example 3 compared to exemplary Composition 1 does not render the composition useful for customization. Comparative Example 3 displays β-quartz as the main phase, compared to the similarly treated Composition 1, which is characterized by an α-quartz main crystalline phase and spinel minor phase, in the absence of a β-phase. It is theorized that the low CTE value exhibited by Comparative Example 3 compared to Composition 1 is in part related to the presence of a β-quartz crystalline main phase remaining in Comparative Example 3, even after the longer heat treatment. Heating of a sample of Comparative Example 3 at an even higher temperature of 1050° C. for 4 hours produced a sample having a CTE value of $35 \times 10^{-7} K^{-1}$, which is only a negligible increase compared to when a sample of Comparative Example 3 is heated at 1000° C. In contrast, samples made from Composition 1 exhibit an increase in CTE value of $36 \times 10^{-7} K^1$ when the heat treatment temperature is increased from 1000° C. to 1050° C.

Comparative Example 4 demonstrates the effect of the absence of $TiO_2$ and the addition of $P_2O_5$ on the characteristics of the glass-ceramic article. Comparative Example 4 produces a glass-ceramic article that is opalescent and has a very low CTE value. Comparative Example 4 also demonstrates a glassy microstructure.

The following non-limiting aspects are encompassed by the present disclosure:

According to a first aspect of the present disclosure, a glass-ceramic article includes an article having a glass-ceramic composition, the composition including:
$SiO_2$ from about 45% to about 65%,
$Al_2O_3$ from about 14% to about 28%,
$TiO_2$ from about 2% to about 4%,
$ZrO_2$ from about 3% to about 4.5%,
MgO from about 4.5% to about 12%, and
ZnO from about 0.1 to about 4% (by weight);
wherein the article includes a coefficient of thermal expansion (CTE) of about $20 \times 10^{-7} K^{-1}$ to about $160 \times 10^{-7} K^{-1}$, as measured over a temperature range from 25° C. to 300° C.

The glass-ceramic article according to the first aspect, wherein a total amount of $TiO_2$ and $ZrO_2$ is greater than about 5% by weight.

The glass-ceramic article according to the first aspect or any intervening aspects can be characterized by a coefficient of thermal expansion (CTE) range defined from a lower end to an upper end, and including intermediate values between the lower end and the upper end, as measured over a temperature range from 25° C. to 300° C., and further wherein the lower end is about $20 \times 10^{-7} K^{-1}$ to about $30 \times 10^{-7} K^{-1}$ and the upper end is from about $55 \times 10^{-7} K^{-1}$ to about $\times 10-7$ $K^{-1}$.

The glass-ceramic article according to the first aspect or any intervening aspects can further include an optical transmittance of at least about 75% at a wavelength of 1060 nm, as measured through a sample having a thickness of about 1 mm or less.

The glass-ceramic article according to the first aspect or any intervening aspects, wherein the article further includes an elastic modulus of about 80 GPa to about 140 GPa.

The glass-ceramic article according to the first aspect or any intervening aspects can further include BaO from greater than 0% to about 8% (by weight).

The glass-ceramic article according to the first aspect or any intervening aspects can further include $SnO_2$ from greater than 0% to about 2% (by weight).

The glass-ceramic article according to the first aspect or any intervening aspects can further include one or more additives selected from the group consisting of $SnO_2$, CaO, BaO, $P_2O_5$, $B_2O_3$, and alkali metal oxides. Optionally, the one or more additives are present in the composition at about 5% or less (by weight).

The glass-ceramic article according to the first aspect or any intervening aspects, wherein the composition is substantially free of alkali metals.

According to a second aspect, an electronic device includes a substrate, the substrate including the glass-ceramic article according to the first aspect or any intervening aspects.

According to a third aspect of the present disclosure, a glass-ceramic article includes an article having a glass-ceramic composition, the composition including:
$SiO_2$ from about 45% to about 65%,
$Al_2O_3$ from about 14% to about 28%,
$TiO_2$ from about 2% to about 4%,
$ZrO_2$ from about 3% to about 4.5%,
MgO from about 4.5% to about 12%, and
ZnO from about 0.1 to about 4% (by weight);
wherein the article further includes at least one of a β-quartz crystalline phase and an α-quartz crystalline phase.

The glass-ceramic article according to the third aspect, wherein a total amount of $TiO_2$ and $ZrO_2$ is greater than about 5% by weight.

The glass-ceramic article according to the third aspect or any intervening aspects can be characterized by a range of ratios of the α-quartz crystalline phase to the β-quartz crystalline phase, the range of ratios defined by a lower end of about 0.3:1 and an upper end of about 74:0.

The glass-ceramic article according to the third aspect or any intervening aspect can further be characterized by at least one additional crystalline phase comprising at least one of a spinel crystalline phase and a gahnite crystalline phase, and further wherein the at least one additional crystalline phase is present from about 8% to about 21% (by weight).

The glass-ceramic article according to the third aspect or any intervening aspect can further be characterized by a coefficient of thermal expansion (CTE) range defined from a lower end to an upper end, as measured over a temperature range from 25° C. to 300° C., and further wherein the lower end is about 20×10-7 $K^{-1}$ to about 30×10-7 $K^{-1}$ and the upper end is from about $55×10^{-7} K^{-1}$ to about $160×10^{-7} K^{-1}$.

The glass-ceramic article according to the third aspect or any intervening aspect can further include an optical transmittance of at least about 75% at a wavelength of 1060 nm, as measured through a sample having a thickness of about 1 mm or less.

The glass-ceramic article according to the third aspect or any intervening aspect, wherein the composition further includes one or more additives selected from the group consisting of $SnO_2$, CaO, BaO, $P_2O_5$, $B_2O_3$, and alkali metal oxides. Optionally, the one or more additives can be present in the composition at about 5% or less (by weight).

The glass-ceramic article according to the third aspect or any intervening aspect, wherein the composition is substantially free of alkali metals.

According to a fourth aspect, an electronic device includes a substrate, wherein the substrate includes the glass-ceramic article according to the third aspect or any intervening aspect.

According to a fifth aspect, a method of making a glass-ceramic article includes forming a glass-ceramic precursor having a composition including:
$SiO_2$ from about 45% to about 65%,
$Al_2O_3$ from about 14% to about 28%,
$TiO_2$ from about 2% to about 4%,
$ZrO_2$ from about 3% to about 4.5%,
MgO from about 5% to about 12%, and
ZnO from about 0.1 to about 4% (by weight); and
heating the glass-ceramic precursor to form a glass-ceramic article, wherein the article includes a coefficient of thermal expansion (CTE) of about $20×10^{-1} K^{-1}$ to about $160×10^{-7} K^{-1}$, as measured over a temperature range from 25° C. to 300° C.

The glass-ceramic article according to the fifth aspect, wherein a total amount of $TiO_2$ and $ZrO_2$ is greater than about 5% by weight.

The method according to the fifth aspect or any intervening aspects, wherein the article is further characterized by a coefficient of thermal expansion (CTE) range defined from a lower end to an upper end, as measured over a temperature range from 25° C. to 300° C., and further wherein the lower end is about $20×10^{-7} K^{-1}$ to about $30×10^{-7} K^{-1}$ and the upper end is from about $55×10^{-7} K^{-1}$ to about $160×10^{-7} K^{-1}$.

The method according to the fifth aspect or any intervening aspect, wherein the heating the glass-ceramic precursor includes heating the glass-ceramic precursor at a first temperature for a first period of time, followed by heating the glass-ceramic precursor at a second temperature for a second period of time.

The method according to the fifth aspect or any intervening aspect, wherein the second period of time is based at least in part on forming the glass-ceramic article with the coefficient of thermal expansion (CTE) of about $20×10^{-7} K^{-1}$ to about $160×10^{-7} K^{-1}$, as measured over a temperature range from 25° C. to 300° C.

The method according to the fifth aspect or any intervening aspect, wherein the second temperature is higher than the first temperature.

The method according to the fifth aspect or any intervening aspect, wherein the second temperature is from about 950° C. to about 1200° C.

The method according to the fifth aspect or any intervening aspect, wherein the second period of time is about 45 minutes to about 300 minutes.

The method according to the fifth aspect or any intervening aspect, wherein the article includes an optical transmittance of at least about 75% at a wavelength of 1060 nm, as measured through a sample having a thickness of about 1 mm or less.

The method according to the fifth aspect or any intervening aspect, wherein the article includes an elastic modulus of about 80 GPa to about 140 GPa.

According to a sixth aspect of the present disclosure, a method of making a glass-ceramic article includes forming a glass-ceramic precursor having a composition including:
$SiO_2$ from about 45% to about 65%,
$Al_2O_3$ from about 14% to about 28%,
$TiO_2$ from about 2% to about 4%,
$ZrO_2$ from about 3% to about 4.5%,
MgO from about 5% to about 12%, and
ZnO from about 0.1 to about 4% (by weight); and
heating the glass-ceramic precursor to form a glass-ceramic article, wherein the article includes at least one of a β-quartz crystalline phase and an α-quartz crystalline phase.

The glass-ceramic article according to the sixth aspect, wherein a total amount of $TiO_2$ and $ZrO_2$ is greater than about 5% by weight.

The method according to the sixth aspect or any intervening aspects, wherein the article is further characterized by a range of ratios of the α-quartz crystalline phase to the β-quartz crystalline phase, the range of ratios defined by a lower end of about 0.3:1 and an upper end of about 74:0.

The method according to the sixth aspect or any intervening aspect, wherein the article is characterized by at least one additional crystalline phase comprising least one of a spinel crystalline phase and a gahnite crystalline phase, and further wherein the at least one additional crystalline phase is present from about 8% to about 21% (by weight).

The method according to the sixth aspect or any intervening aspect, wherein the article is further characterized by a coefficient of thermal expansion (CTE) range defined from a lower end to an upper end, as measured over a temperature range from 25° C. to 300° C., and further wherein the lower end is about $20 \times 10^{-7}$ K$^{-1}$ to about $30 \times 10^{-7}$ K$^{-1}$ and the upper end is from about $55 \times 10^{-7}$ K$^{-1}$ to about $160 \times 10^{-7}$ K$^{-1}$.

The method according to the sixth aspect or any intervening aspect, wherein the heating the glass-ceramic precursor includes heating the glass-ceramic precursor at a first temperature for a first period of time, followed by heating the glass-ceramic precursor at a second temperature for a second period of time. Optionally, the second period of time is based at least in part on forming the glass-ceramic article with the at least one of a β-quartz crystalline phase and an α-quartz crystalline phase.

The method according to the sixth aspect or any intervening aspect, wherein the second temperature is higher than the first temperature.

The method according to the sixth aspect or any intervening aspect, wherein the second temperature is from about 950° C. to about 1200° C.

The method according to the sixth aspect or any intervening aspect, wherein the second period of time is about 45 minutes to about 300 minutes.

The method according to the sixth aspect or any intervening aspect, wherein the article includes an optical transmittance of at least about 75% at a wavelength of 1060 nm, as measured through a sample having a thickness of about 1 mm or less.

The method according to the sixth aspect or any intervening aspect, wherein the article includes an elastic modulus of about 80 GPa to about 140 GPa.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A glass-ceramic article, comprising:
   an article having a glass-ceramic composition, the composition comprising:
   $SiO_2$ from about 45% to about 65%,
   $Al_2O_3$ from about 14% to about 28%,
   $TiO_2$ from about 2% to about 4%,
   $ZrO_2$ from about 3% to about 4.5%,
   MgO from about 4.5% to about 12%, and
   ZnO from about 0.1 to about 4% (by weight of oxide);
   wherein the article comprises a coefficient of thermal expansion (CTE) of about $20 \times 10^{-7}$ K$^{-1}$ to about $160 \times 10^{-7}$ K$^{-1}$, as measured over a temperature range from 25° C. to 300° C.,
   wherein the article further comprises a β-quartz crystalline phase and an α-quartz crystalline phase, and
   wherein the article is characterized by a range of ratios of the α-quartz crystalline phase to the β-quartz crystalline phase, the range of ratios defined by a lower end of about 0.3:1 and an upper end of about 16:1.

2. The glass-ceramic article of claim 1, wherein the article is characterized by a coefficient of thermal expansion (CTE) range defined from a lower end to an upper end, and including intermediate values between the lower end and the upper end, as measured over a temperature range from 25° C. to 300° C., and further wherein the lower end is about $30 \times 10^{-7}$ K$^{-1}$ and the upper end is about $160 \times 10^{-7}$ K$^{-1}$.

3. The glass-ceramic article according to claim 1, wherein the article further comprises at least one of:
   an optical transmittance of at least about 75% at a wavelength of 1060 nm, as measured through a sample having a thickness of about 1 mm or less; and
   an elastic modulus of about 80 GPa to about 140 GPa.

4. The glass-ceramic article according to claim 1, wherein the composition further comprises at least one of:
   BaO from greater than 0% to about 8% (by weight of oxide); and
   $SnO_2$ from greater than 0% to about 2% (by weight of oxide).

5. The glass-ceramic article according to claim 1, wherein the composition is substantially free of alkali metals.

6. A glass-ceramic article, comprising:
   an article having a glass-ceramic composition, the composition comprising:
   $SiO_2$ from about 45% to about 65%,
   $Al_2O_3$ from about 14% to about 28%,
   $TiO_2$ from about 2% to about 4%,
   $ZrO_2$ from about 3% to about 4.5%,
   MgO from about 5% to about 12%, and
   ZnO from about 0.1 to about 4% (by weight of oxide);
   wherein the article further comprises a β-quartz crystalline phase and an α-quartz crystalline phase,
   wherein the article is characterized by a range of ratios of the α-quartz crystalline phase to the β-quartz crystalline phase, the range of ratios defined by a lower end of about 0.3:1 and an upper end of about 16:1.

7. The glass-ceramic article according to claim 6, wherein the article is further characterized by at least one additional crystalline phase comprising at least one of a spinel crystalline phase and a gahnite crystalline phase, and further wherein the at least one additional crystalline phase is present from about 8% to about 21% (by weight of oxide).

8. The glass-ceramic article according to claim 6, wherein the article is further characterized by a coefficient of thermal expansion (CTE) range defined from a lower end to an upper end, as measured over a temperature range from 25° C. to 300° C., and further wherein the lower end is about $20 \times 10^{-7}$ K$^{-1}$ and the upper end is from about $160 \times 10^{-7}$ K$^{-1}$.

9. The glass-ceramic article according to claim 6, wherein the article further comprises at least one of:
   an optical transmittance of at least about 75% at a wavelength of 1060 nm, as measured through a sample having a thickness of about 1 mm or less; and
   an elastic modulus from about 80 GPa to about 140 GPa.

10. The glass-ceramic article according to claim 6, wherein each of the β-quartz and α-quartz crystalline phases comprises a ratio of aluminum to silicon, the ratio in the β-quartz crystalline phase greater than the ratio in the α-quartz crystalline phase.

11. An electronic device, comprising:
    a substrate, the substrate comprising the glass-ceramic according to claim 6.

12. A method of making a glass-ceramic article, comprising:
    forming a glass-ceramic precursor having a composition comprising:
    $SiO_2$ from about 45% to about 65%,
    $Al_2O_3$ from about 14% to about 28%,
    $TiO_2$ from about 2% to about 4%,
    $ZrO_2$ from about 3% to about 4.5%,
    MgO from about 5% to about 12%, and ZnO from about 0.1 to about 4% (by weight of oxide); and heating the glass-ceramic precursor to form a glass-ceramic article, wherein the article comprises a coefficient of thermal expansion (CTE) of about $20\times10^{-7}$ $K^{-1}$ to about $160\times10^{-7}$ $K^{-1}$, as measured over a temperature range from 25° C. to 300° C. and wherein the article further comprises a β-quartz crystalline phase and an α-quartz crystalline phase, and wherein the article is characterized by a range of ratios of the α-quartz crystalline phase to the β-quartz crystalline phase, the range of ratios defined by a lower end of about 0.3:1 and an upper end of about 16:1.

13. The method according to claim 12, wherein the article is further characterized by a coefficient of thermal expansion (CTE) range defined from a lower end to an upper end, as measured over a temperature range from 25° C. to 300° C., and further wherein the lower end is about $20\times10^{-7}$ $K^{-1}$ and the upper end is about $160\times10^{-7}$ $K^{-1}$.

14. The method according to claim 12, wherein the heating the glass-ceramic precursor comprises heating the glass-ceramic precursor at a first temperature for a first period of time, followed by heating the glass-ceramic precursor at a second temperature for a second period of time.

15. The method according to claim 14, wherein the second period of time is based at least in part on forming the glass-ceramic article with the coefficient of thermal expansion (CTE) of about $20\times10^{-7}$ $K^{-1}$ to about $160\times10^{-7}$ $K^{-1}$, as measured over a temperature range from 25° C. to 300° C.

16. The method according to claim 14, wherein the second temperature is at least one of:

higher than the first temperature; and from about 950° C. to about 1200° C.

17. The method of claim 14, wherein the second period of time is based at least in part on forming the glass-ceramic article with the β-quartz crystalline phase and the α-quartz crystalline phase.

* * * * *

UNITED STATES PATENT AND TRADEMARK OFFICE
CERTIFICATE OF CORRECTION

PATENT NO. : 11,370,693 B2
APPLICATION NO. : 16/750570
DATED : June 28, 2022
INVENTOR(S) : Marie Jacqueline Monique Comte et al.

It is certified that error appears in the above-identified patent and that said Letters Patent is hereby corrected as shown below:

On the Title Page

On the page 2, in Column 1, under "Other Publications", Line 1, delete "MgOAl203Si02" and insert -- MgOAl2O3SiO2 --.

On the page 2, in Column 1, under "Other Publications", Line 2, delete "Zr02" and insert -- ZrO2 --.

On the page 2, in Column 1, under "Other Publications", Lines 4-5, delete "Mg0-Al203-Si02-Ti02" and insert -- MgO-Al2O3-SiO2-TiO2 --.

On the page 2, in Column 1, under "Other Publications", Line 8, delete "Zn0/Mg0/Al203/Ti02/Zr02/Si02" and insert -- ZnO/MgO/Al2O3/TiO2/ZrO2/SiO2 --.

On the page 2, in Column 1, under "Other Publications", Line 8, delete "Glasses"";" and insert -- Glasses"; --.

On the page 2, in Column 1, under "Other Publications", Line 11, delete "Mg0-Zn0-Al203-Si02-ZrO2"" and insert -- MgO-ZnO-Al2O3-SiO2-ZrO2" --.

Signed and Sealed this
Eleventh Day of October, 2022

Katherine Kelly Vidal
*Director of the United States Patent and Trademark Office*